US008336066B2

(12) United States Patent
Murakami et al.

(10) Patent No.: US 8,336,066 B2
(45) Date of Patent: Dec. 18, 2012

(54) COMMUNICATION APPARATUS AND EVENT PROCESSING METHOD OF THE SAME

(75) Inventors: Takashi Murakami, Osaka (JP); Takeshi Kokado, Kyoto (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 12/672,114

(22) PCT Filed: Aug. 8, 2008

(86) PCT No.: PCT/JP2008/002169
§ 371 (c)(1),
(2), (4) Date: Feb. 4, 2010

(87) PCT Pub. No.: WO2009/019890
PCT Pub. Date: Feb. 12, 2009

(65) Prior Publication Data
US 2011/0224807 A1 Sep. 15, 2011

(30) Foreign Application Priority Data
Aug. 8, 2007 (JP) .................................. 2007-207054
Aug. 8, 2007 (JP) .................................. 2007-207055

(51) Int. Cl.
*H04N 7/10* (2006.01)
(52) U.S. Cl. .............................. 725/32; 726/26; 709/247
(58) Field of Classification Search .................... 726/26; 713/168; 725/32; 709/231, 232, 247
See application file for complete search history.

(56) References Cited

U.S. PATENT DOCUMENTS

| | | | |
|---|---|---|---|
| 6,839,901 B1 * | 1/2005 | De Saint Marc et al. | 725/32 |
| 6,857,017 B1 * | 2/2005 | Faour et al. | 709/224 |
| 7,028,324 B2 * | 4/2006 | Shimizu et al. | 725/32 |
| 7,086,075 B2 * | 8/2006 | Swix et al. | 725/10 |
| 7,966,396 B2 | 6/2011 | Sojian | |
| 8,015,234 B2 | 9/2011 | Lum | |
| 8,032,608 B2 * | 10/2011 | Sojian et al. | 709/217 |
| 8,051,125 B2 | 11/2011 | Lum | |
| 8,234,676 B2 * | 7/2012 | Klein et al. | 725/58 |
| 2005/0198322 A1 | 9/2005 | Takabayashi et al. | |
| 2006/0077446 A1 | 4/2006 | Lum | |
| 2006/0077447 A1 | 4/2006 | Sojian | |
| 2006/0077449 A1 | 4/2006 | Lum | |
| 2006/0095541 A1 | 5/2006 | Sojian | |
| 2006/0212571 A1 | 9/2006 | Tanaka et al. | |
| 2007/0018784 A1 * | 1/2007 | Yoon et al. | 340/3.7 |

FOREIGN PATENT DOCUMENTS

| | | |
|---|---|---|
| JP | 2005-242543 | 9/2005 |
| JP | 2006-260125 | 9/2006 |
| JP | 2007-026439 | 2/2007 |
| JP | 2007-102774 | 4/2007 |

OTHER PUBLICATIONS

International Search Report issued Oct. 28, 2008 in International (PCT) Application No. PCT/JP2008/002169.

(Continued)

*Primary Examiner* — Beemnet Dada
(74) *Attorney, Agent, or Firm* — Wenderoth, Lind & Ponack, L.L.P.

(57) ABSTRACT

An intercom notifies a television connected via a network of an occurrence of an event. The intercom includes an event message generating unit that generates an event message indicating the occurrence of the event and including media information indicating media of event information that is obtainable by the television and that is associated with the event, and a communication unit that transmits the event message to the television via the network.

26 Claims, 35 Drawing Sheets

OTHER PUBLICATIONS

"Bus-Type Home Control System Using Coaxial Cables," National Technical Report, vol. 32, No. 6, Dec. 1986 (with partial English translation).

"Universal Plug and Play Device Architecture," Version 1.0, pp. 1-40, Jun. 8, 2000.

* cited by examiner

FIG. 8

| Event category | Setting | Event type | Setting |
|---|---|---|---|
| Trouble | Notification | Abnormal diagnosis | — |
| | | Operation failure | — |
| Prevent crime | — | Detected by sensor camera | No notification |
| | | Detect abnormality in electric lock | Notification |
| Prevent disaster | Notification | Fire sensor | — |
| Visitor | No notification | Detected by entrance slave unit | — |

FIG. 9

| Event category | Event type | Event control for each scene | | |
|---|---|---|---|---|
| | | At home | Sleep | Outing |
| Trouble | Abnormal diagnosis | Notification | Notification | Notification |
| | Operation failure | Notification | Notification | Notification |
| Prevent crime | Detected by sensor camera | No notification | Notification | Notification |
| | Detect abnormality in electric lock | No notification | Notification | Notification |
| Prevent disaster | Fire sensor | No notification | Notification | Notification |
| Visitor | Detected by entrance slave unit | No notification | No notification | Notification |

FIG. 10

| Information element | Detail |
|---|---|
| Level | Notice |
| Message | Visitor at entrance |
| WebURL | http://xxxx:80/event/interphone.html |
| DeviceCategory | Intercom_entrance-slave-unit_ID |
| EventCategory | Visitor_entrance-slave-unit-detection |
| MediaInfo | m=audio 6384 RTP/AVP   341<br>a=G711<br>a=audiochannels=1<br>a=ptime:20<br><br>m=video 8000 TCP   342<br>a=M-JPEG<br>a=framesize=320x240<br>a=framerate:15.000<br>a=uri:http://xxxx:8000/MotionJpeg?Resolution=320x240<br><br>m=video 6385 RTP/AVP   343<br>a=MPEG4<br>a=framesize=320x240<br>a=framerate:30.000 |

320

331 Level
332 Message
333 WebURL
334 DeviceCategory
335 EventCategory
336 MediaInfo

FIG. 11

| Information element | Detail |
|---|---|
| Level | Notice |
| Message | Visitor at entrance |
| WebURL | http://xxxx:80/event/cam.html |
| DeviceCategory | Intercom_sensor-camera_ID |
| EventCategory | Prevent-crime_sensor-camera-detection |
| MediaInfo | m=video 8000 TCP<br>a=M-JPEG<br>a=framesize=320x240<br>a=framerate:15.000<br>a=uri:http://xxxx:8000/MotionJpeg?Resolution=320x240<br>m=video 6385 RTP/AVP<br>a=MPEG4<br>a=framesize=320x240<br>a=framerate:30.000 |

331 Level
332 Message
333 WebURL
334 DeviceCategory
335 EventCategory
336 MediaInfo 321
344
345

FIG. 12

| Information element | Detail |
|---|---|
| Level | Alert |
| Message | Fire sensor in kitchen is activated |
| WebURL | http://xxxx:80/event/sensor.html |
| DeviceCategory | Intercom_fire-sensor_ID |
| EventCategory | Prevent-disaster_fire-sensor-detection |
| MediaInfo | None |

322

331 Level
332 Message
333 WebURL
334 DeviceCategory
335 EventCategory
336 MediaInfo

FIG. 13

| Information element | Detail |
|---|---|
| Level | Notice |
| Message | Sensor of NW camera is activated |
| WebURL | http://xxxx:80/event/cam.html |
| DeviceCategory | NW-camera_ID |
| EventCategory | Prevent-crime_camera-sensor-detection |
| MediaInfo | m=audio 6384 RTP/AVP<br>a=G711<br>a=audiochannels=1<br>a=ptime:20   — 346<br><br>m=video 8000 TCP<br>a=M-JPEG<br>a=framesize=640x480<br>a=framerate:15.000<br>a=uri:http://xxxx:8000/MotionJpeg?Resolution=640x480   — 347<br><br>m=video 8000 TCP<br>a=M-JPEG<br>a=framesize=320x240<br>a=framerate:30.000<br>a=uri:http://xxxx:8000/MotionJpeg?Resolution=320x240   — 348<br><br>m=video 6385 RTP/AVP 96<br>a=MPEG4<br>a=framesize=640x480<br>a=framerate:30.000   — 349 |

323

331 Level
332 Message
333 WebURL
334 DeviceCategory
335 EventCategory
336 MediaInfo

FIG. 14

| Event category | Event type | Server unit | | | |
|---|---|---|---|---|---|
| | | Web | M-JPEG | MPEG4 | Audio |
| Trouble | Abnormal diagnosis | Information source of trouble detail information | None | None | None |
| Trouble | Operation failure | Information source of trouble detail information | None | None | None |
| Prevent crime | Detected by sensor camera | Information source of camera still image information | Information source of camera video information | Information source of camera video information | None |
| Prevent crime | Detect abnormality in electric lock | Information source of detected detail information | None | None | None |
| Prevent disaster | Fire sensor | Information source of detected detail information | None | None | None |
| Visitor | Detected by entrance slave unit | Information source of still image information of camera in entrance slave unit | Information source of camera video information | Information source of camera video information | Information source of entrance slave unit |

FIG. 15

| Event category | Event type | Server unit | | | |
|---|---|---|---|---|---|
| | | Web | M-JPEG | H.264 | Audio |
| Trouble | Abnormal diagnosis | URL of trouble detail information | None | None | None |
| Trouble | Operation failure | URL of trouble detail information | None | None | None |
| Prevent crime | Detected by sensor | URL of camera still image information | URL of camera video information | URL of camera video information | None |

FIG. 18

| Event category | Event type | Available information-source information | | |
|---|---|---|---|---|
| | | Television | Recorder | Television supports audio |
| Trouble | Abnormal diagnosis | URL of web information | Not available | URL of web information |
| Trouble | Operation failure | URL of web information | Not available | URL of web information |
| Prevent crime | Detected by sensor camera | URL of web information | Information source of M-JPEG information | Information source of H.264 and audio |
| Prevent crime | Detect abnormality in electric lock | URL of web information | Not available | URL of web information |
| Prevent disaster | Fire sensor | URL of web information | Not available | URL of web information |
| Visitor | Detected by entrance slave unit | URL of web information | URL of M-JPEG | Information source of H.264 and audio |

FIG. 21

Event control for each scene — 302

| Event category | Event type | At home | Sleep | Outing |
|---|---|---|---|---|
| Trouble | Abnormal diagnosis | Record character information | Record character information | Record character information |
| Trouble | Operation failure | Record character information | Record character information | Record character information |
| Prevent crime | Detected by sensor camera | No record | Record video | Record video |
| Prevent crime | Detect abnormality in electric lock | No record | No record | Record character information |
| Prevent disaster | Fire sensor | No record | No record | No record |
| Visitor | Detected by entrance slave unit | No record | No record | Record video |

311 — Event category
312 — Event type
315, 316 — columns

FIG. 27

| | | Event transmitting apparatus | |
|---|---|---|---|
| | | Authentication information has initial value | Authentication information has already been shared |
| Event receiving apparatus | Authentication information has initial value | • Share authentication information of event receiving apparatus | • Share authentication information of event transmitting apparatus |
| | Authentication information has already been shared | • Share authentication information of event receiving apparatus | • Share when authentication information of both apparatuses are identical<br>• Not share when authentication information of both apparatuses are different |

501

SUBSCRIBE Subscription access destination HTTP/1.1

HOST: publisher host:publisher port

CALLBACK: <Delivery URL including ID of event receiving apparatus> 511

NT: upnp:event

TIMEOUT: Subscription time period

NOTIFY * HTTP/1.1
HOST: 239.255.255.250:1900
CACHE-CONTROL: max-age = seconds until advertisement expires ~531
LOCATION: Apparatus-information access destination
NT: search target
NTS: ssdp:alive
SERVER: OS/version UPnP/1.0 product/version
USN: advertisement UUID ~532

HTTP/1.1 200 OK

CACHE-CONTROL: max-age = seconds until advertisement expires

DATE: when response was generated

EXT:

LOCATION: Apparatus-information access destination ~551

SERVER: OS/version UPnP/1.0 product/version

ST: search target

USN: advertisement UUID ~552

COMMUNICATION APPARATUS AND EVENT PROCESSING METHOD OF THE SAME

TECHNICAL FIELD

The present invention relates to a communication apparatus connected to a network and communication processing of the same, and in particular to a communication apparatus and an event processing method of the same, for notifying occurrence of an event or receiving the notification.

BACKGROUND ART

In recent years, progress has been made in networking home appliances, mainly audio-video equipment. Thereby, the home appliances can interact with each other by detecting other home appliances through networks (home networks). More specifically, when a call is made through an intercom installed at, for example, an entrance, information indicating occurrence of the call and video captured by a camera included in the intercom are displayed on a television and others.

Such an interactive operation needs a mechanism for notifying other home appliances (hereinafter each referred to as event receiving apparatus), such as a television, of a state change (event) occurring in a home appliance (hereinafter referred to as event transmitting apparatus), such as an intercom. The Universal Plug and Play (UPnP) Device Architecture is known as the industry standard specification for providing the mechanism for the event notification (for example, see Non-patent Reference 1).

However, although the UPnP provides the mechanism for the event notification, the specification relies on each apparatus to uniquely define details of each event. Thus, there is a problem that the event receiving apparatus needs to know the definition and the processing method of each event so that the event receiving apparatus performs processing corresponding to the received event.

Accordingly, the event receiving apparatus needs to incorporate the processing method suitable for the event transmitting apparatus in advance. Thus, the event receiving apparatus has a difficulty of later adding an event transmitting apparatus as an apparatus to interact with.

As a method for solving the problem, what is known is a method including: placing, in a web page, information items (or user interfaces for processing) to be provided in association with respective events; and transmitting a Uniform Resource Locator (URL) included in a parameter in an event message when an event is notified so that the event transmitting apparatus accesses the web page (for example, see Patent Reference 1).

Non-patent Reference 1: UPnP Device Architecture 1.0
Patent Reference 1: Japanese Unexamined Patent Application Publication No. 2006-260125

DISCLOSURE OF INVENTION

Problems that Invention is to Solve

However, according to the method disclosed in Patent Reference 1, the event receiving apparatus needs a browsing function for displaying information of the web page. Here, a browser is generally a complicated software program. Thus, there is a problem that the cost of the event receiving apparatus having such a browser increases.

Furthermore, when one desires to transmit video data or audio data from the event transmitting apparatus to the event receiving apparatus as information in association with an event (hereinafter referred to as event information), there are cases where the capability of the event transmitting apparatus cannot be fully used due to, for example, limitations of the browser.

More specifically, there are cases where depending on a category of an event occurring in the event transmitting apparatus and a type of an event receiving apparatus, transmitting information from the event transmitting apparatus to a browser is appropriate. On the other hand, there are other cases where transmitting information (information compressed using a specific codec) from the event transmitting apparatus to a specific application using a Real-time Transport Protocol (RTP) and others is more appropriate.

In other words, in the conventional method, there is a problem that the event transmitting apparatus cannot present event information of an appropriate medium to an event receiving apparatus, according to an event category of an event and a type of the event receiving apparatus. Additionally, there is a problem that the event receiving apparatus cannot select a medium suitable to itself. Here, a category of event information, such as video and audio, a transmission method of, for example, information for a browser and the RTP, and a format, such as a compression method, a bit rate, image quality, and sound quality are collectively referred to as media.

Furthermore, categories of an event necessary for the networking apparatuses vary for each event receiving apparatus or according to a use status of the user. Thus, there is a problem that the networking apparatuses cannot be easily used solely by receiving event information in the same media at any time.

Thus, the object of the present invention is to provide a communication apparatus (event transmitting apparatus) that can present event information of suitable media, and a communication apparatus (event receiving apparatus) that can select a medium suitable for itself and obtain event information of the selected medium.

Means to Solve the Problems

In order to achieve the object, the communication apparatus according to an aspect of the present invention is a communication apparatus that notifies an event receiving apparatus of occurrence of an event, the event receiving apparatus being connected to the communication apparatus via a network, and that includes: an event message generating unit configured to generate an event message indicating the occurrence of the event, the event message including media information indicating media of event information that is obtainable by the event receiving apparatus and is associated with the event; and a communication unit configured to transmit the event message to the event receiving apparatus via the network.

With the configuration, the communication apparatus according to an aspect of the present invention transmits, to the event receiving apparatus, the event message including information indicating the media. Thereby, the event receiving apparatus can select a medium suitable for the event receiving apparatus and obtain event information of the selected medium. Furthermore, the communication apparatus according to an aspect of the present invention can present event information of a suitable medium to the event receiving apparatus.

Furthermore, the communication apparatus may further include an information transmitting unit configured to transmit the event information to the event receiving apparatus in a medium designated by the event receiving apparatus among the media indicated by the media information.

Furthermore, the media information may further include information indicating a storage location of each of the media, and the information transmitting unit may specify the event information using the information of the storage location designated by the event receiving apparatus, and transmit the specified event information to the event receiving apparatus.

With the configuration, the event receiving apparatus can select a medium suitable for the event receiving apparatus by designating a storage location of the event information corresponding to the media and included in the event message, and receive event information of the selected medium.

Furthermore, the media information may include at least one of: information indicating whether each of the media is video, a still image, and audio; a pixel size of the video and the still image; a frame rate of the video; a compression method of the media; and a transmission method of the event information.

With the configuration, the event receiving apparatus can select a medium suitable for itself, using the media type included in the event message.

Furthermore, the event message may further include category information indicating one of an event category of the event, an event type of the event, and a combination of the event category and the event type of the event.

With the configuration, the event receiving apparatus can determine an event category and an event type of the event using the category information included in the event message, and according to the determined category and type of the event, it can select a medium and determine whether or not to obtain the event information.

Furthermore, the communication apparatus may further include a setting holding unit configured to hold setting information in which each setting of event categories, event types, or combinations of the event categories and the event types of the event indicates whether or not it is necessary to notify the event receiving apparatus of the event, wherein the event message generating unit is configured to generate an event message of an event including one of the event categories, one of the event types, or one of the combinations of the event categories and the event types that is set in the setting information as required to notify the event receiving apparatus, and not to generate an event message of an event including one of the event categories, one of the event types, or one of the combinations of the event categories and the event types that is set in the setting information as not required to notify the event receiving apparatus.

With the configuration, the communication apparatus according to an aspect of the present invention can determine whether or not it is necessary to transmit an event message according to the setting indicated in the setting information.

Furthermore, the communication apparatus may further include: an authentication unit configured to share authentication information between the communication apparatus and the event receiving apparatus, when the communication apparatus receives an authentication message including the authentication information from the event receiving apparatus; and a subscription verification unit configured to accept, when a subscription request message transmitted by the event receiving apparatus includes the shared authentication information, a subscription for transmitting the event message to the event receiving apparatus when the event occurs, and not to accept the subscription when the subscription request message does not include the shared authentication information.

With the configuration, the communication apparatus according to an aspect of the present invention shares authentication information with the event receiving apparatus prior to the subscription. Thereby, the communication apparatus according to an aspect of the present invention verifies the authentication information included in the subscription request message so that it can determine whether or not the event receiving apparatus that is a transmission source of the subscription request message is an authentic event receiving apparatus. Thus, the communication apparatus according to an aspect of the present invention can accept a subscription request only from an authentic event receiving apparatus desired to interact with each other.

Furthermore, the authentication information may include an identification unique to the communication apparatus.

Furthermore, the authentication information may include a password unrelated to information unique to the communication apparatus and the event receiving apparatus.

Furthermore, the authentication message may include model information indicating a model of the event receiving apparatus, the authentication unit may share the authentication information with the event receiving apparatus when the model information indicates a predetermined model, and may not share the authentication information with the event receiving apparatus when the model information does not indicate the predetermined model.

With the configuration, the communication apparatus according to an aspect of the present invention can accept a subscription request only from an event receiving apparatus desired to interact with each other.

Furthermore, the authentication unit may share the authentication information with event receiving apparatuses including the event receiving apparatus, and the authentication unit may share the authentication information with one of the event receiving apparatuses that is a transmission source of the authentication message when a count of the event receiving apparatuses with which the authentication unit has shared the authentication information is smaller than a predetermined count, and may not share the authentication information with the one of the event receiving apparatuses that is the transmission source of the authentication message when the count of the event receiving apparatuses with which the authentication unit has shared the authentication information is not smaller than the predetermined count.

Furthermore, the authentication message may include model information indicating a model of the event receiving apparatus, the predetermined count may be set for each model of the event receiving apparatus, and the authentication unit may share the authentication information with the one of the event receiving apparatuses that is the transmission source of the authentication message when a count of event receiving apparatuses that are of a same model as the one of the event receiving apparatuses is smaller than a predetermined count set to the model, among the event receiving apparatuses with which the communication apparatus has shared the authentication information, and may not share the authentication information with the one of the event receiving apparatuses when the count of the event receiving apparatuses that are of the same model as the one of the event receiving apparatuses is not smaller than the predetermined count set to the model, among the event receiving apparatuses with which the communication apparatus has shared the authentication information.

Furthermore, the communication apparatus may have a normal mode and a registration mode that can be switched in response to an operation from outside the communication apparatus, the authentication unit may share the authentication information between the communication apparatus and the event receiving apparatus when the communication apparatus is in the registration mode, and the subscription verification unit may accept the subscription when the communication apparatus is in the normal mode.

With the configuration, since the communication apparatus according to an aspect of the present invention shares authentication information in the registration mode that is a special mode, it more significantly can prevent a false connection and an unauthorized access.

Furthermore, the communication apparatus may further include: an information providing unit configured to transmit an information obtainment response message to the event receiving apparatus, when the communication apparatus receives an information obtainment request message from the event receiving apparatus, the information obtainment request message requesting obtainment of information of the communication apparatus, and the information obtainment response message including a storage location of the information of the communication apparatus; and a network managing unit configured to transmit, to the event receiving apparatus, a connection notification message for notifying the event receiving apparatus of information indicating that the communication apparatus is connected to the network, wherein the connection notification message may include the storage location of the information of the communication apparatus, and the information providing unit may change the storage location of the information of the communication apparatus when the information of the communication apparatus is changed.

With the configuration, the event receiving apparatus can determine whether or not the information of the communication apparatus is changed according to whether or not the storage location included in the information obtainment response message or the connection notification message is changed.

Furthermore, the communication apparatus according to an aspect of the present invention is a communication apparatus that receives an event message from an event transmitting apparatus, the event message indicating occurrence of an event, and the communication apparatus being connected to the event transmitting apparatus via a network, wherein the event message includes media information indicating media of event information that is obtainable by the communication apparatus and is associated with the event, and the communication apparatus includes: a communication unit configured to receive the event message transmitted from the event transmitting apparatus via the network; a media selecting unit configured to select at least one of the media indicated by the media information; an information obtaining unit configured to obtain the event information in the at least one of the media selected by the media selecting unit; and an event information processing unit configured to process the event information obtained by the information obtaining unit.

With the configuration, the communication apparatus according to an aspect of the present invention can select a medium suitable for the communication apparatus using the media information indicating the media, and obtain the event information of the selected medium.

Furthermore, the media information may include information indicating a storage location of each of the media, and the information obtaining unit may obtain the event information using the information indicating a corresponding one of the storage locations that is associated with the at least one of the media selected by the media selecting unit.

With the configuration, the communication apparatus according to an aspect of the present invention can select a medium suitable for itself by designating a storage location of event information corresponding to the media and included in the event message, and receive the event information of the selected medium.

Furthermore, the media information may include at least one of: information indicating whether each of the media is video, a still image, and audio; a pixel size of the video and the still image; a frame rate of the video; a compression method of the media; and a transmission method of the event information, and the media selecting unit may select a corresponding one of the media that is predetermined and can be processed by the communication apparatus.

With the configuration, the communication apparatus according to an aspect of the present invention can select a medium suitable for itself, using a media type included in the event message.

Furthermore, the event message may further include category information indicating one of an event category of the event, an event type of the event, and a combination of the event category and the event type of the event, the communication apparatus may further include a setting holding unit configured to hold setting information in which each setting of event categories, event types, or combinations of the event categories and the event types of the event indicates whether or not it is necessary to obtain the event information associated with the event, and the information obtaining unit may obtain the event information when the category information indicates one of the event categories, one of the event types, or one of the combinations of the event categories and the event types that is set in the setting information as required to obtain the event information, and may not obtain the event information when the category information indicates one of the event categories, one of the event types, or one of the combinations of the event categories and the event types that is set in the setting information as not required to obtain the event information.

With the configuration, the communication apparatus according to an aspect of the present invention can determine an event category and an event type of the event using the category information included in the event message, and can determine whether or not to obtain the event information according to the determined category and type of the event.

The communication apparatus may further include: an authentication request unit configured to transmit, to the event transmitting apparatus, an authentication message for sharing authentication information between the communication apparatus and the event transmitting apparatus; and a subscription request unit configured to transmit a subscription request message to the event transmitting apparatus, the subscription request message requesting the communication apparatus to transmit the event message, wherein the subscription request message may include the authentication information.

With the configuration, the communication apparatus according to an aspect of the present invention shares authentication information with the event transmitting apparatus prior to the subscription, and transmits the subscription request message including the shared authentication information to the event transmitting apparatus. Thereby, the event transmitting apparatus verifies the authentication information included in the subscription request message so that it can determine whether or not the event receiving apparatus that is a transmission source of the subscription request message is an authentic event receiving apparatus. Thus, the event transmitting apparatus can accept a subscription request only from an authentic communication apparatus desired to interact with each other.

Furthermore, the authentication information may include an identification unique to the communication apparatus.

Furthermore, the authentication information may include a password unrelated to information unique to the communication apparatus and the event transmitting apparatus.

Furthermore, the authentication request unit may transmit, to the event transmitting apparatus, the authentication message including model information indicating a model of the communication apparatus.

With the configuration, the event transmitting apparatus can accept a subscription request only from a communication apparatus desired to interact with each other, using the model information.

Furthermore, the model information may include one of a product number, a production date, and a serial number of the communication apparatus.

With the configuration, the event transmitting apparatus can accept a subscription request only from a communication apparatus desired to interact with each other, using one of a product number, a production date, and a serial number of the communication apparatus that are included in the model information.

Furthermore, the authentication request unit may transmit shared information to the event transmitting apparatus, the shared information indicating whether the communication apparatus has already shared the authentication information with an apparatus other than the event transmitting apparatus.

With the configuration, the event transmitting apparatus can determine authentication information to be shared with the communication apparatus and determine whether or not to share the authentication information, according to whether or not the communication apparatus has already shared the authentication information with another apparatus.

The present invention can be implemented not only as such a communication apparatus but also as an event processing method using characteristic units included in the communication apparatus as steps and as a program causing a computer to execute such characteristic steps. It is obvious that such program can be distributed by recording media, such as a CD-ROM, and via transmission media, such as the Internet. Furthermore, the present invention can be implemented as a communication apparatus that notifies occurrence of an event and as a communication system including the communication apparatus that is notified of occurrence of an event.

Effects of the Invention

Thus, the present invention can provide a communication apparatus (event transmitting apparatus) that can present event information of suitable media, and a communication apparatus (event receiving apparatus) that can select a medium suitable for itself and obtain event information of the selected medium.

BRIEF DESCRIPTION OF DRAWINGS

FIG. 8 illustrates an example of a structure of setting information of the intercom according to Embodiment 1 in the present invention.

FIG. 9 illustrates a variation of setting information of the intercom according to Embodiment 1 in the present invention.

FIG. 10 illustrates an example of an event message to be notified in a state change of an entrance slave unit of an intercom system according to Embodiment 1 in the present invention.

FIG. 11 illustrates an example of an event message to be notified in a state change of a sensor camera of the intercom system according to Embodiment 1 in the present invention.

FIG. 12 illustrates an example of an event message to be notified in a state change of a fire sensor of the intercom system according to Embodiment 1 in the present invention.

FIG. 13 illustrates an example of event information to be notified in a state change of an NW camera according to Embodiment 1 in the present invention.

FIG. 14 illustrates correspondences between event types and information sources of event information in the intercom according to Embodiment 1 in the present invention.

FIG. 15 illustrates correspondences between event types and information sources of event information in the NW camera according to Embodiment 1 in the present invention.

FIG. 18 illustrates an example of correspondences between the event receiving apparatuses according to Embodiment 1 in the present invention and available information-source information.

FIG. 21 illustrates a variation of setting information of the recorder according to Embodiment 1 in the present invention.

FIG. 27 shows a method in which the intercom according to Embodiment 2 in the present invention determines authentication information to be shared.

FIG. 33 illustrates an example of a network connection notification message according to Embodiment 4 in the present invention.

FIG. 35 illustrates an example of a search response message according to Embodiment 4 in the present invention.

NUMERICAL REFERENCES

Figure 1:
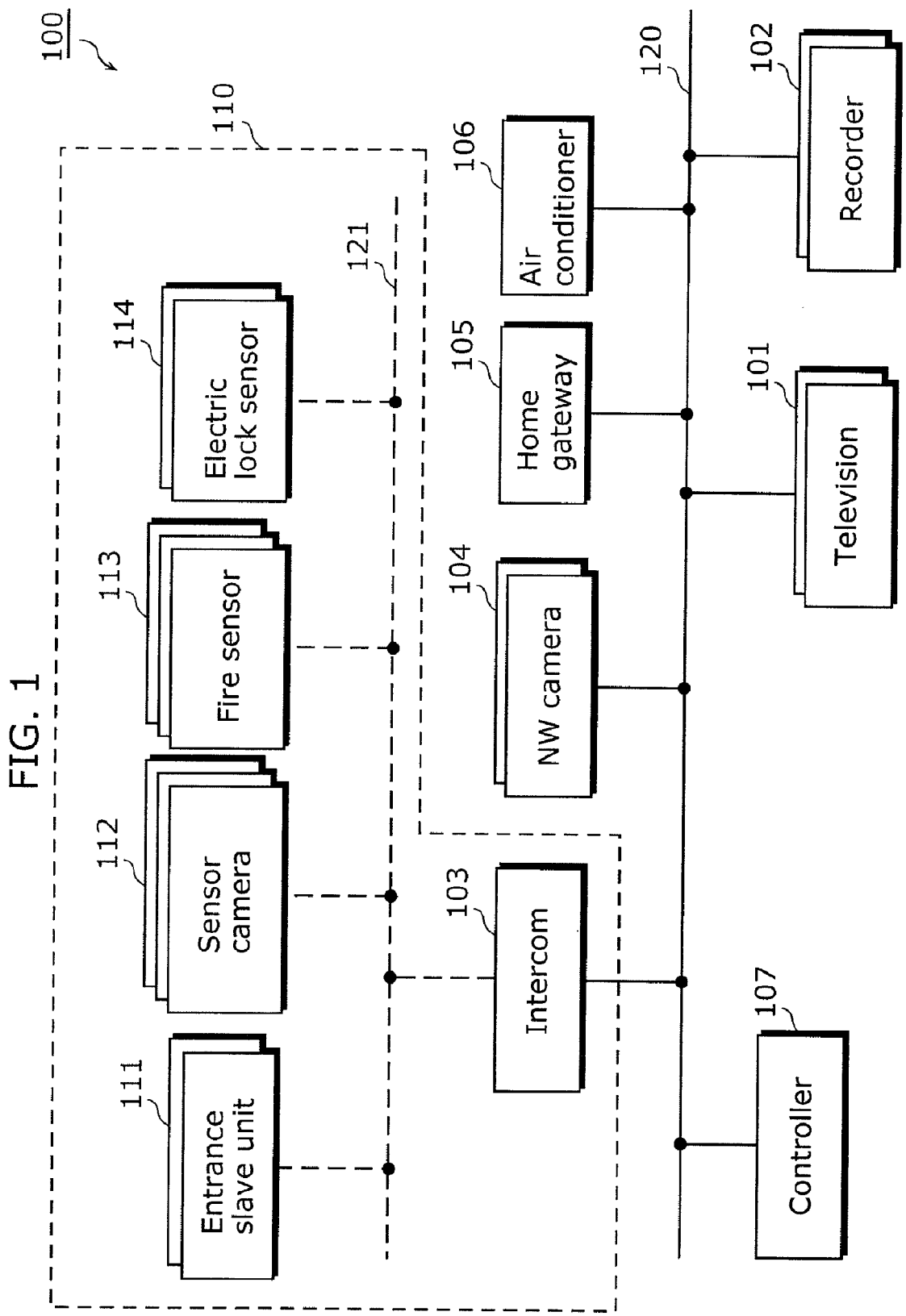
FIG. 1 illustrates a block diagram of a configuration of a communication system according to Embodiment 1 in the present invention.

100 Communication system
101 Television
102 Recorder
103 Intercom
104 NW camera
105 Home gateway
106 Air conditioner
107 Controller
110 Intercom system
111 Entrance slave unit
112 Sensor camera
113 Fire sensor
114 Electric lock sensor
120 Network
121 Link
131 Communication unit
132 Event message generating unit
133 Transmission event control unit
134 Information storage location obtaining unit
135 Server unit
136 Camera unit
137 Sensor unit
138 Own communication unit
151 Web server unit
152 Motion-JPEG server unit
153 MPEG4 server unit
154 Audio information server unit
155 Information storage unit
156 Subscription control unit
211 Communication unit
212 Event analyzing unit
213 Received-event control unit
214 Display sequence control unit
215 Obtained information determining unit
216 Information obtaining control unit
217 Video display unit
218 Subscription control unit
221 Information recording/reproducing unit
300, 301, 302 Setting information
311 Event category
312 Event type
313, 314, 316 Setting
315 User's state
317 Information source
318 Event-receiving-apparatus type
319 Information source
320, 321, 322, 323 Event message
331 Level
332 Message
333 Web URL
334 Device category
335 Event category
336 MediaInfo
341, 342, 343, 344, 345, 346, 347, 348, 349 Media information
350 Television broadcast video
351 Message
352 Event information
412 Event-transmitting-apparatus managing unit
413 Search unit
414 Authentication request unit
415 Subscription request unit
416 Information obtainment request unit
422 Network managing unit
425 Search response unit
426 Information providing unit
427 Authentication verification unit
428 Event-receiving-apparatus managing unit
429 Subscription verification unit
501 Subscription request message
511 CALLBACK
521 Network connection notification message
531, 551 LOCATION
532, 552 USN
541 Search response message

BEST MODE FOR CARRYING OUT THE INVENTION

A communication system including a communication apparatus according to embodiments in the present invention will be described with reference to drawings.

Embodiment 1

In a communication system according to Embodiment 1 in the present invention, an event transmitting apparatus transmits an event message including information indicating media transmittable by the event transmitting apparatus, to an event receiving apparatus. Thereby, the event receiving apparatus can select and obtain event information of the media suitable for itself.

First, the communication system according to Embodiment 1 will be described.

FIG. 1 illustrates a block diagram of a configuration of the communication system according to Embodiment 1 in the present invention.

A communication system 100 illustrated in FIG. 1 is a communication system using the UPnP, and includes televisions 101 each of which is a digital television receiver; recorders 102, such as a Digital Versatile Disk (DVD) recorder, a Blu-ray Disc (BD) recorder, and an hard disc (HD)

recorder; network (NW) cameras 104; a home gateway 105; an air conditioner 106; a controller 107; an intercom system 110; and a network 120.

Furthermore, the intercom system 110 includes an intercom 103, entrance slave units 111, sensor cameras 112, fire sensors 113, electric lock sensors 114, and a link 121.

The televisions 101, the recorders 102, the intercom 103, the NW cameras 104, the home gateway 105, the air conditioner 106, and the controller 107 are connected to and can communicate with each other via the network 120.

The network 120 is a home network (customer premises network) or a corporate network that has been built in a company. Here, the network 120 may be the Ethernet (trademark), a wired network such as a lighting circuit, a wireless network, such as a wireless LAN and Bluetooth, and a network using both wired and wireless networks.

The intercom 103, the NW cameras 104, the home gateway 105, and the air conditioner 106 are event transmitting apparatuses each transmitting an event message indicating occurrence of an event to an event receiving apparatus. Here, the event indicates a state change in an event transmitting apparatus and a state change in an apparatus under the control of the event transmitting apparatus (for example, a communication apparatus included in the intercom system 110). Furthermore, the event transmitting apparatus transmits information in association with an event (hereinafter referred to as event information) to an event receiving apparatus in response to a request from the event receiving apparatus.

The televisions 101, the recorders 102, and the controller 107 are event receiving apparatuses each of which (i) receives an event message transmitted from an event transmitting apparatus, such as the intercom system 110 and the NW camera 104, (ii) analyzes details of the event message, and (iii) obtain the event information from the event transmitting apparatus.

The television 101 displays the obtained event information on its screen, while the recorder 102 records the obtained event information and reproduces the recorded event information in response to a user operation.

The NW camera 104 includes a human sensor using infrared rays and others, and notifies an event receiving apparatus of occurrence of an event when the human sensor detects a person and others. Furthermore, the NW camera 104 transmits video and audio captured by the NW camera 104, as event information of the event to an event receiving apparatus.

Furthermore, the intercom 103, the entrance slave units 111, the sensor cameras 112, the fire sensors 113, and the electric lock sensors 114 are connected to each other via the link 121 unique to the intercom system 110.

The intercom 103 detects occurrence of an event in an apparatus included in the intercom system 110 (the entrance slave units 111, the sensor cameras 112, the fire sensors 113, and the electric lock sensors 114) via the link 121, and transmits the event message to an event receiving apparatus connected to the network 120. Furthermore, the intercom 103 obtains the event information of the occurring event from an apparatus included in the intercom system 110, and transmits the event message including a storage location of the event information to the event receiving apparatus.

Here, the entrance slave unit 111 includes a call button, a camera, and a microphone, and notifies the intercom 103 of occurrence of an event upon a press of the call button by a visitor. Furthermore, when an event occurs, the entrance slave unit 111 transmits video of the visitor captured by the camera and audio collected by the microphone to the intercom 103 as the event information of the event.

The sensor camera 112 includes a human sensor using infrared rays and others as in the NW cameras 104, and notifies the intercom 103 of occurrence of an event when the human sensor detects a person and others. Furthermore, the sensor camera 112 transmits video captured by the sensor camera 112 as the event information of the event to the intercom 103 via the link 121.

The fire sensor 113 notifies the intercom 103 of occurrence of an event of detecting a fire from heat, smoke, and others.

The electric lock sensor 114 notifies the intercom 103 of occurrence of an event of detecting picking a lock and others.

Individual identifications (IDs) are allocated to these apparatuses in the intercom system 110, and even when the intercom system 110 includes apparatuses of the same type, the intercom 103 can distinguish the apparatuses from each other. For example, even when the entrance slave unit 111 is installed in each of an entrance and a back door, the individual ID can distinguish the corresponding entrance slave unit 111 whose call button is pressed by a visitor.

The configuration of the communication system 100 illustrated in FIG. 1 is an example, and the configuration remains the same even when the apparatuses included in the communication system 100 are respectively plural. Furthermore, the communication system 100 may include other home appliances, a personal computer (PC), and PC peripheral devices.

Next, a functional configuration of the event transmitting apparatus will be described with reference to FIGS. 2 and 3.

Figure 2:
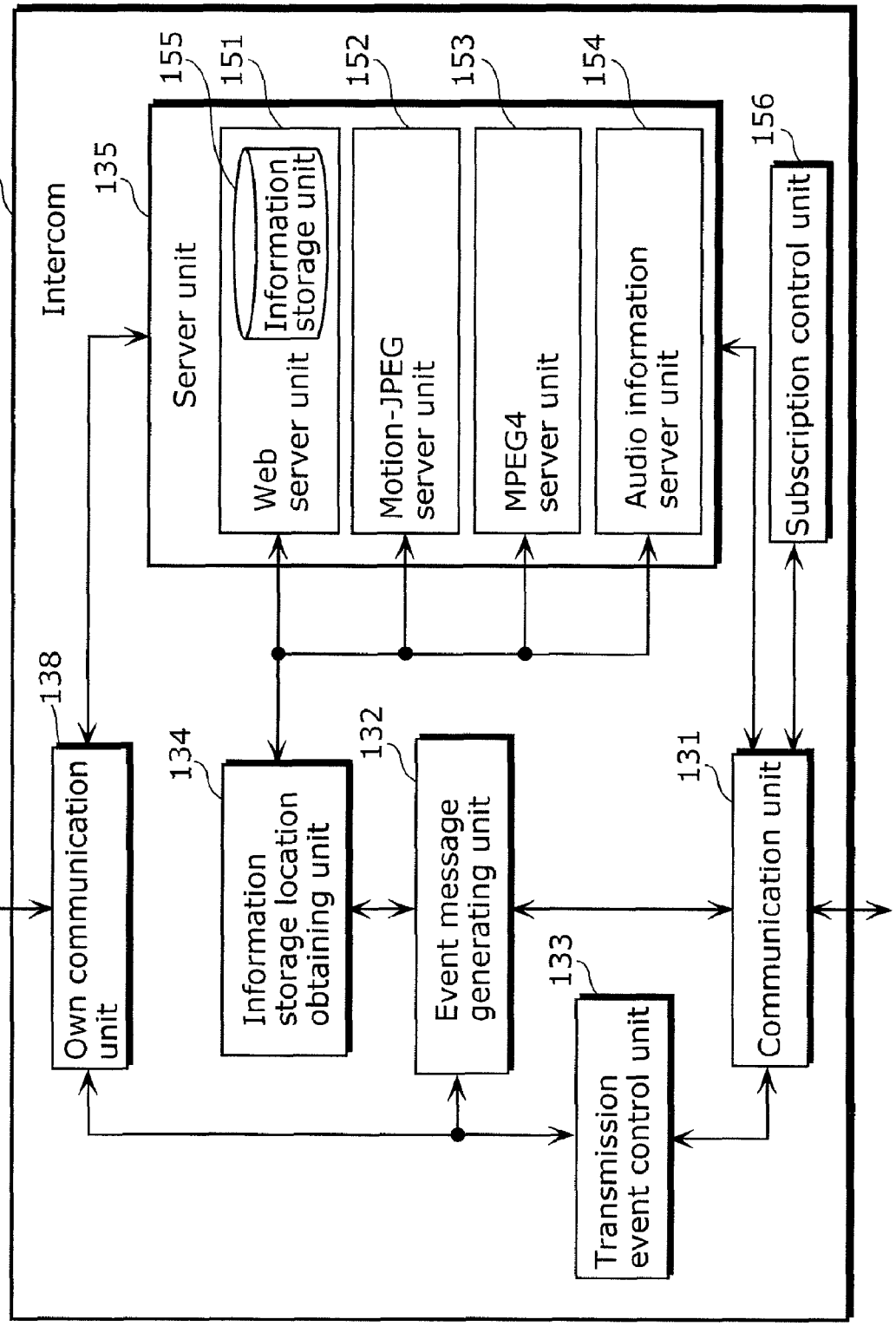
FIG. 2 illustrates a block diagram of an example of a functional configuration of an intercom according to Embodiment 1 in the present invention.

FIG. 2 illustrates a block diagram of an example of a functional configuration of the intercom 103 according to Embodiment 1 in the present invention. As illustrated in FIG. 2, the intercom 103 includes an own communication unit 138, an event message generating unit 132, a transmission event control unit 133, an information storage location obtaining unit 134, a server unit 135, a communication unit 131, and a subscription control unit 156.

The own communication unit 138 transmits and receives information to and from an apparatus in the intercom system 110 via the link 121. More specifically, the own communication unit 138 obtains notification of occurrence of an event and the event information from an apparatus in the intercom system 110.

The transmission event control unit 133 holds setting information. The setting information is information in which each setting of event categories, event types, or combinations of the event categories and the event types of the event indicates whether or not it is necessary to notify an event receiving apparatus of the event. Furthermore, the setting information is set from outside the intercom system 110 via a user interface (UI) included in the intercom 103 or via the network 120.

The information storage location obtaining unit 134 selects at least one of media transmittable by the server unit 135, and obtains a storage location of event information of the selected at least one of the media.

The event message generating unit 132 generates an event message indicating occurrence of an event when detecting the event (state change) in an apparatus included in the intercom system 110. The event message generating unit 132 transmits the event message to an event receiving apparatus through the communication unit 131.

Furthermore, the event message generating unit 132 generates an event message of an event including one of the event categories, one of the event types, or one of the combinations of the event categories and the event types that is set in the setting information held by the transmission event control unit 133 as required to notify an event receiving apparatus. In contrast, the event message generating unit 132 does not generate an event message of an event including one of the event categories, one of the event types, or one of the combinations of the event categories and the event types that is set in the setting information as not required to notify an event receiving apparatus.

Furthermore, the event message includes information indicating media transmittable by the server unit 135. In other words, the event message includes information indicating media of the event information obtainable by an event receiving apparatus. More specifically, the event message includes a storage location of the event information of the media obtained by the information storage location obtaining unit 134.

The communication unit 131 transmits and receives information to and from another apparatus in the communication system 100 via the network 120. More specifically, the communication unit 131 transmits the event message and the event information to an event receiving apparatus.

The server unit 135 transmits, to an event receiving apparatus through the communication unit 131, the event information in a medium designated by the event receiving apparatus among the media. The server unit 135 includes a web server unit 151, a Motion-JPEG server unit 152, an MPEG4 server unit 153, and an audio information server unit 154.

Furthermore, the server unit 135 selects one of the server units 151 to 154 that correspond to source information obtained from the communication unit 131, and the selected one of the server units 151 to 154 provides an event receiving apparatus with the event information. Here, the source information is information indicating a storage location of the event information specified by the event receiving apparatus, and the server unit 135 determines one of the server units 151 to 154 that correspond to the storage location indicated by the source information. In other words, the server unit 135 specifies the event information using the source information, and transmits the specified event information to the event receiving apparatus.

The web server unit 151 includes an information storage unit 155 that stores event information described in HTML. The web server unit 151 transmits event information corresponding to an URL indicated in the source information included in the event information stored in the information storage unit 155.

The Motion-JPEG server unit 152 obtains video information from the entrance slave units 111 and the sensor cameras 112 through the own communication unit 138. Then, the Motion-JPEG server unit 152 compresses the obtained video information in Motion-JPEG format (hereinafter also referred to as M-JPEG), and transmits the compressed video information to an event receiving apparatus.

The MPEG4 server unit 153 obtains video information from the entrance slave units 111 and the sensor cameras 112 through the own communication unit 138, compresses the obtained video information in MPEG4 format, and transmits the compressed video information to an event receiving apparatus.

The audio information server unit 154 obtains audio information from the entrance slave units 111 through the own communication unit 138, and transmits the obtained audio information to an event receiving apparatus.

The subscription control unit 156 receives a subscription request message transmitted from an event receiving apparatus, and transmits, to the event receiving apparatus, a subscription response message that is a response to the subscription request message. Here, the subscription request message is a message from the event receiving apparatus for requesting the event transmitting apparatus to transmit an event message.

Furthermore, upon occurrence of an event, the event transmitting apparatus transmits an event message only to an event receiving apparatus that has accepted the subscription request.

Figure 3:
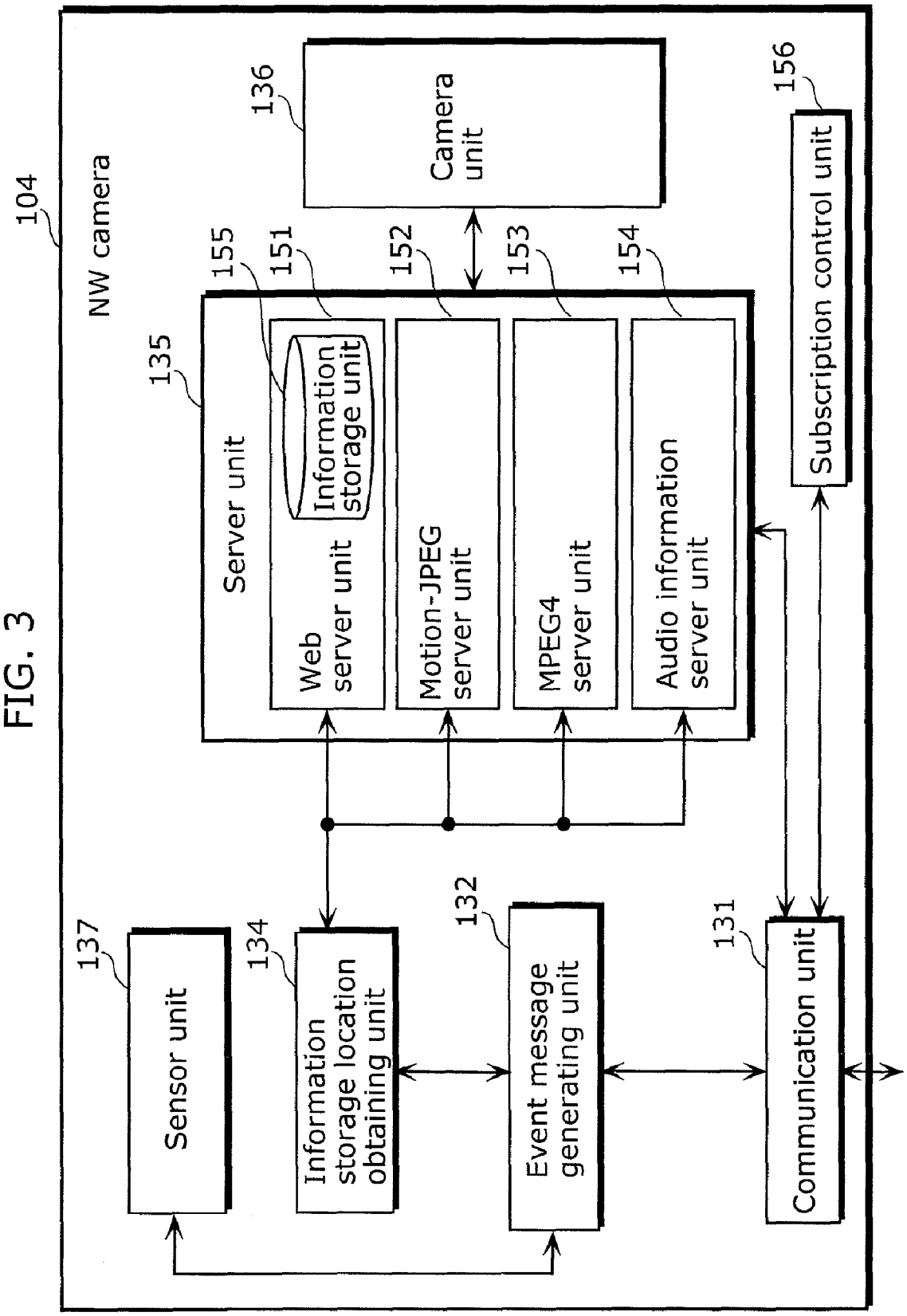
FIG. 3 illustrates a block diagram of an example of a functional configuration of an NW camera according to Embodiment 1 in the present invention.

FIG. 3 illustrates a block diagram of an example of a functional configuration of the NW camera 104 according to Embodiment 1 in the present invention. The functional units included in both FIGS. 2 and 3 are numbered by the same numerals, and thus the descriptions are omitted hereinafter.

The NW camera 104 in FIG. 3 includes the communication unit 131, the event message generating unit 132, the information storage location obtaining unit 134, the server unit 135, a camera unit 136, a subscription control unit 156, and a sensor unit 137.

The camera unit 136 includes a camera and a microphone, and obtains video information captured by the camera, and audio information collected by the microphone. The sensor unit 137 detects an intruder using infrared rays and others.

The difference of the NW camera 104 from the intercom 103 is that (i) the server unit 135 obtains the video information and the audio information from the camera unit 136, (ii) the event message generating unit 132 detects a state change (occurrence of an event) using the sensor unit 137, and (iii) the NW camera 104 does not include the own communication unit 138 and the transmission event control unit 133. Since the NW camera 104 does not include the transmission event control unit 133, it transmits all of the detected events to an event receiving apparatus.

Figure 4:
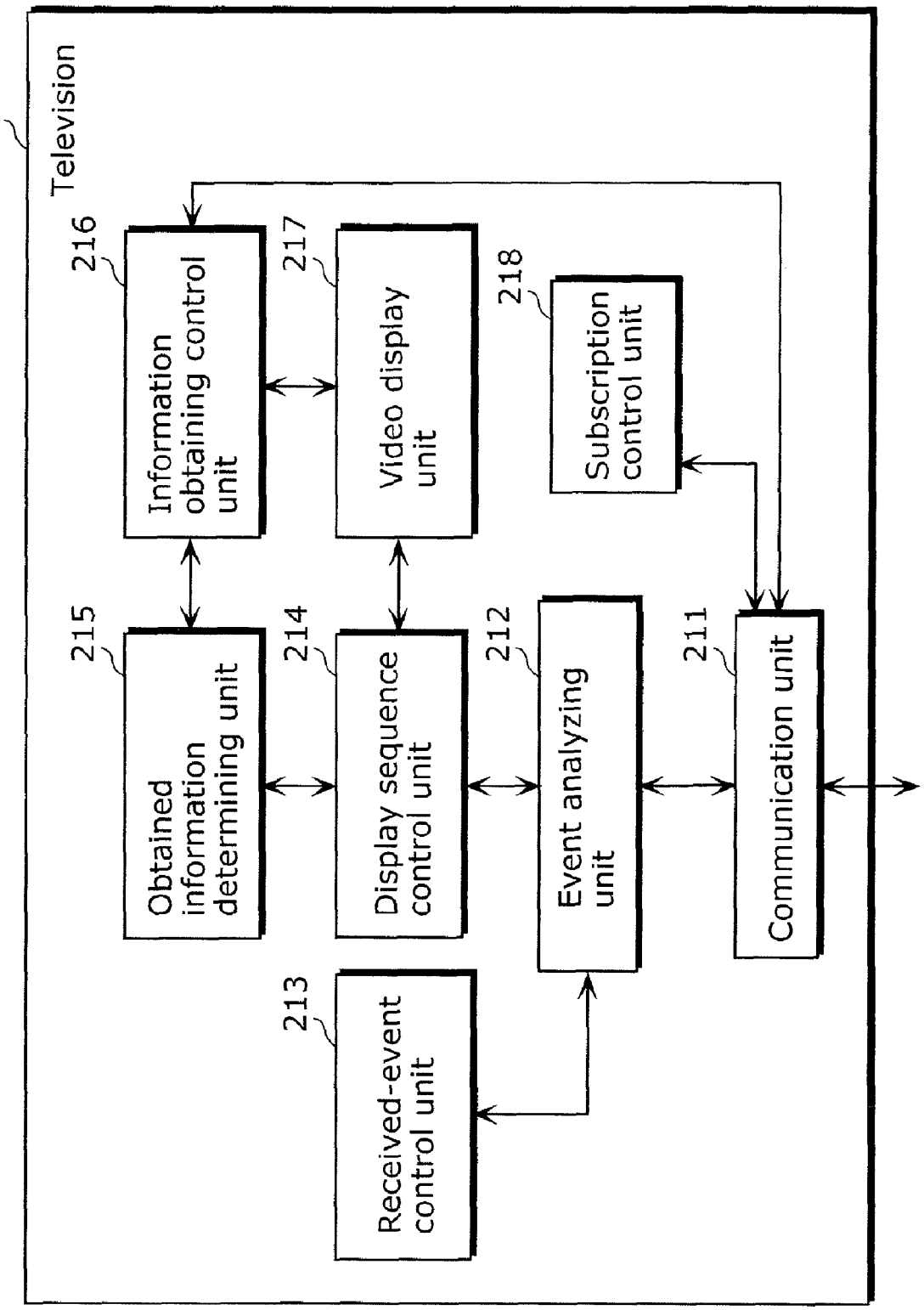
FIG. 4 illustrates a block diagram of an example of a functional configuration of a television according to Embodiment 1 in the present invention.

Next, the functional configuration of an event receiving apparatus will be described with reference to FIGS. 4 and 5. FIG. 4 illustrates a block diagram of an example of a functional configuration of the television 101 according to Embodiment 1 in the present invention.

As illustrated in FIG. 4, the television 101 includes a communication unit 211, an event analyzing unit 212, a received-event control unit 213, a display sequence control unit 214, an obtained information determining unit 215, an information obtaining control unit 216, a video display unit 217, and a subscription control unit 218.

The communication unit 211 communicates with another apparatus via the network 120. More specifically, the communication unit 211 receives the event message and the event information transmitted from an event transmitting apparatus.

The event analyzing unit 212 analyzes details of the event message received by the communication unit 211.

The received-event control unit 213 holds setting information. The setting information is information in which each setting of event categories, event types, or combinations of the event categories and the event types of an event indicates whether or not it is necessary to perform processing on the event. Here, the processing on an event is processing of selecting media and obtaining event information of the selected media.

Furthermore, the setting information is set by the user through the UI included in the television 101. Here, the setting information may be set via the network 120.

The display sequence control unit 214 controls an event display sequence upon receipt of an event message, according to predetermined details. More specifically, the display sequence control unit 214 controls whether event information is obtained after displaying a message included in an event message, or event information is immediately obtained without displaying the message.

The obtained information determining unit 215 selects at least one of the media from among the media indicated in information included in an event message. More specifically, the obtained information determining unit 215 determines a medium of the event information that should be obtained with reference to information of a media type included in the event message, using the event message analyzed by the event analyzing unit 212. In other words, the obtained information determining unit 215 selects the medium that is predetermined and that can be processed by the event receiving apparatus.

The information obtaining control unit 216 obtains event information from a storage location of the event information of the medium selected by the obtained information determining unit 215 through the communication unit 211. More specifically, the information obtaining control unit 216 obtains the event information from the storage location by transmitting, to a event transmitting apparatus, an event information obtainment request including the source information specifying the storage location of the event information.

Here, the information obtaining control unit 216 obtains event information of an event when the setting of one of the event categories, one of the event types, or one of the combinations of the event categories and one of the event types is set in the setting information held by the received-event control unit 213 as required to obtain the event information. In contrast, the information obtaining control unit 216 does not obtain event information of an event when the setting of one of the event categories, one of the event types, or one of the combinations of the event categories and the event types is set in the setting information as not required to obtain the event information.

The video display unit 217 displays broadcast images, and the event information obtained by the information obtaining control unit 216. More specifically, the video display unit 217 displays video of the event information and provides audio of the event information.

The subscription control unit 218 generates a subscription request message, and transmits the generated subscription request message to the event transmitting apparatus.

Next, the functional configuration of the recorder 102 will be described with reference to FIG. 5.

Figure 5:
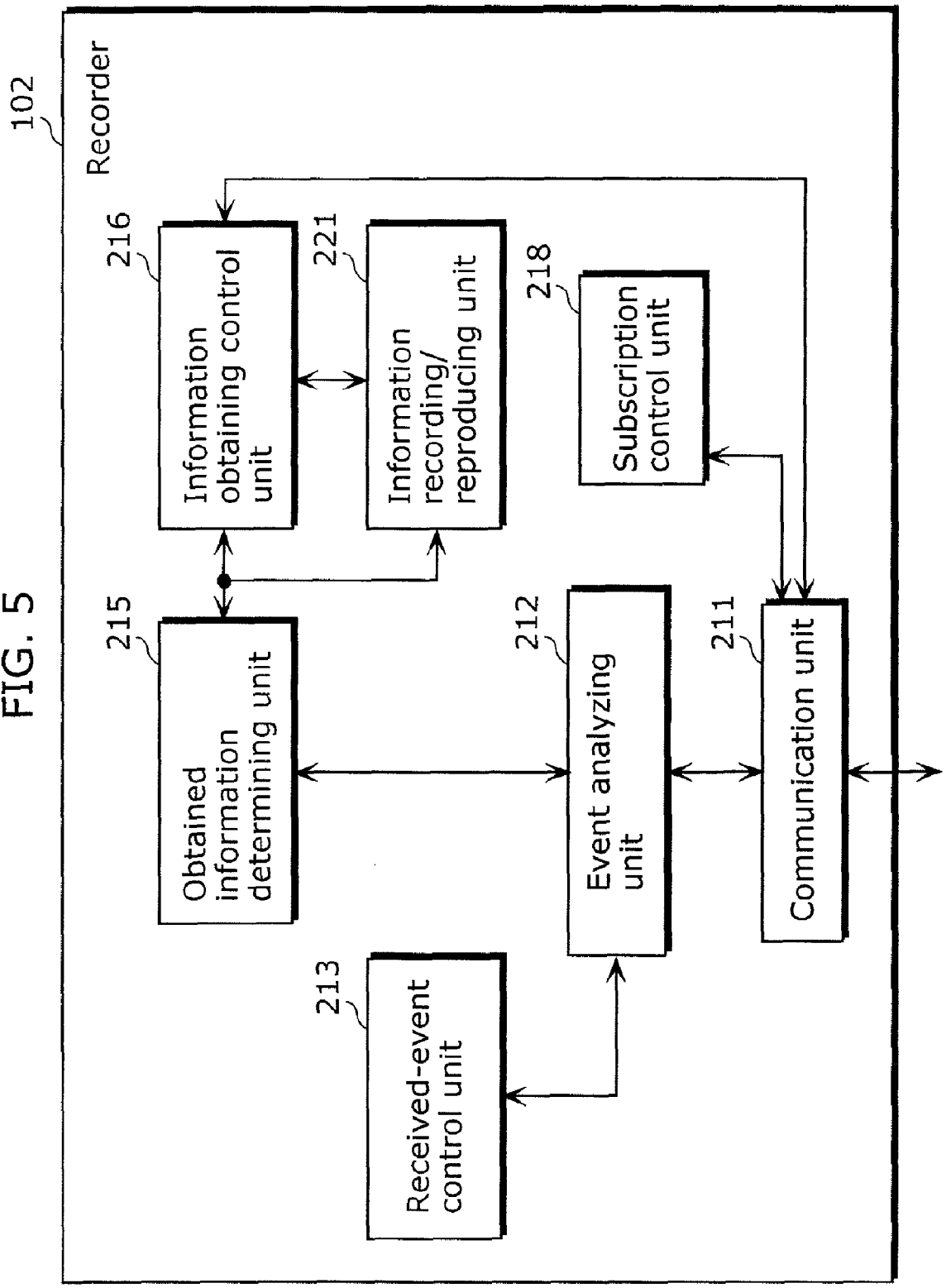
FIG. 5 illustrates a block diagram of an example of a functional configuration of a recorder according to Embodiment 1 in the present invention.

FIG. 5 illustrates a block diagram of an example of a functional configuration of a recorder according to Embodiment 1 in the present invention. The functional units included in both FIGS. 4 and 5 are numbered by the same numerals, and thus the descriptions are omitted hereinafter.

An information recording/reproducing unit 221 records the event information obtained by the information obtaining control unit 216. Furthermore, the information recording/reproducing unit 221 reproduces the event information in response to an instruction from the user.

The difference between the recorder 102 and the television 101 is that since the user does not always view information obtained by the recorder 102 in real time, the recorder 102 does not include the display sequence control unit 214.

Figure 6:
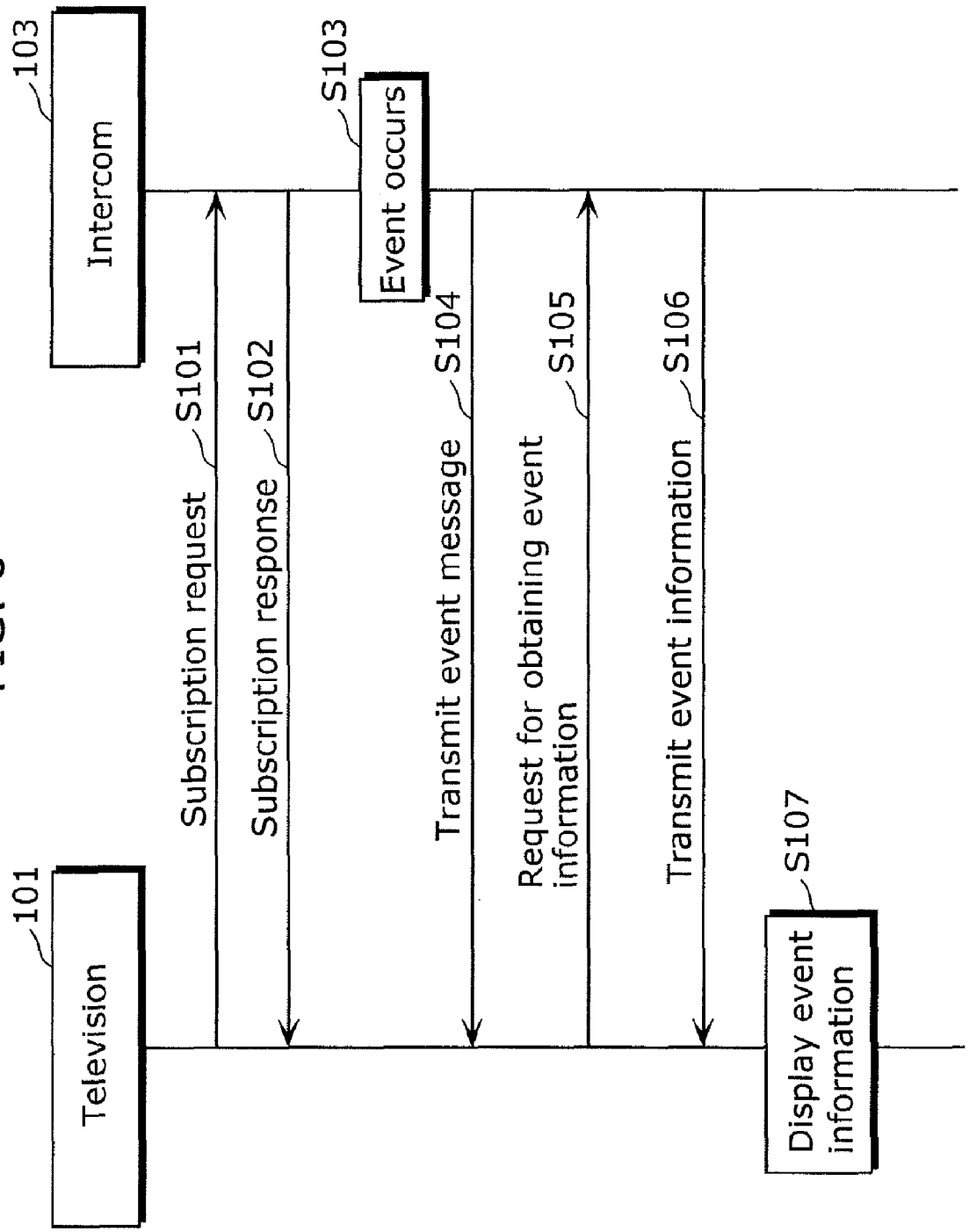
FIG. 6 illustrates a processing procedure of the communication system according to Embodiment 1 in the present invention.

Next, the overview of event notification and transmission of the event information between an event transmitting apparatus and an event receiving apparatus will be described with reference to FIG. 6. FIG. 6 shows a processing procedure in the communication system 100. The example herein will be described using the intercom 103 as an event transmitting apparatus and the television 101 as an event receiving apparatus. Furthermore, assuming the NW camera 104 as an event transmitting apparatus and the recorder 102 as an event receiving apparatus, the same processing will be basically performed.

First, the subscription control unit 218 in the television 101 transmits a subscription request message to the intercom 103 (S101).

The intercom 103 receives the subscription request message transmitted by the television 101, and the subscription control unit 156 in the intercom 103 accepts the subscription request from the television 101. The subscription control unit 156 transmits a subscription response message indicating acceptance of the subscription request to the television 101 (S102).

Next, an event occurs in the intercom 103 (S103).

Due to the occurrence of the event, the intercom 103 transmits an event message to the television 101 that has accepted the subscription request (S104).

Next, the television 101 selects at least one of media indicated in the event message, and requests the intercom 103 to transmit event information corresponding to the selected media (S105).

Next, the intercom 103 transmits the event information specified by the television 101 to the television 101 (S106).

Next, the television 101 displays the received event information (S107).

Hereinafter, event transmission processing (Steps S103 and S104 in FIG. 6) by the intercom 103 will be described in detail with reference to FIG. 7.

Figure 7:
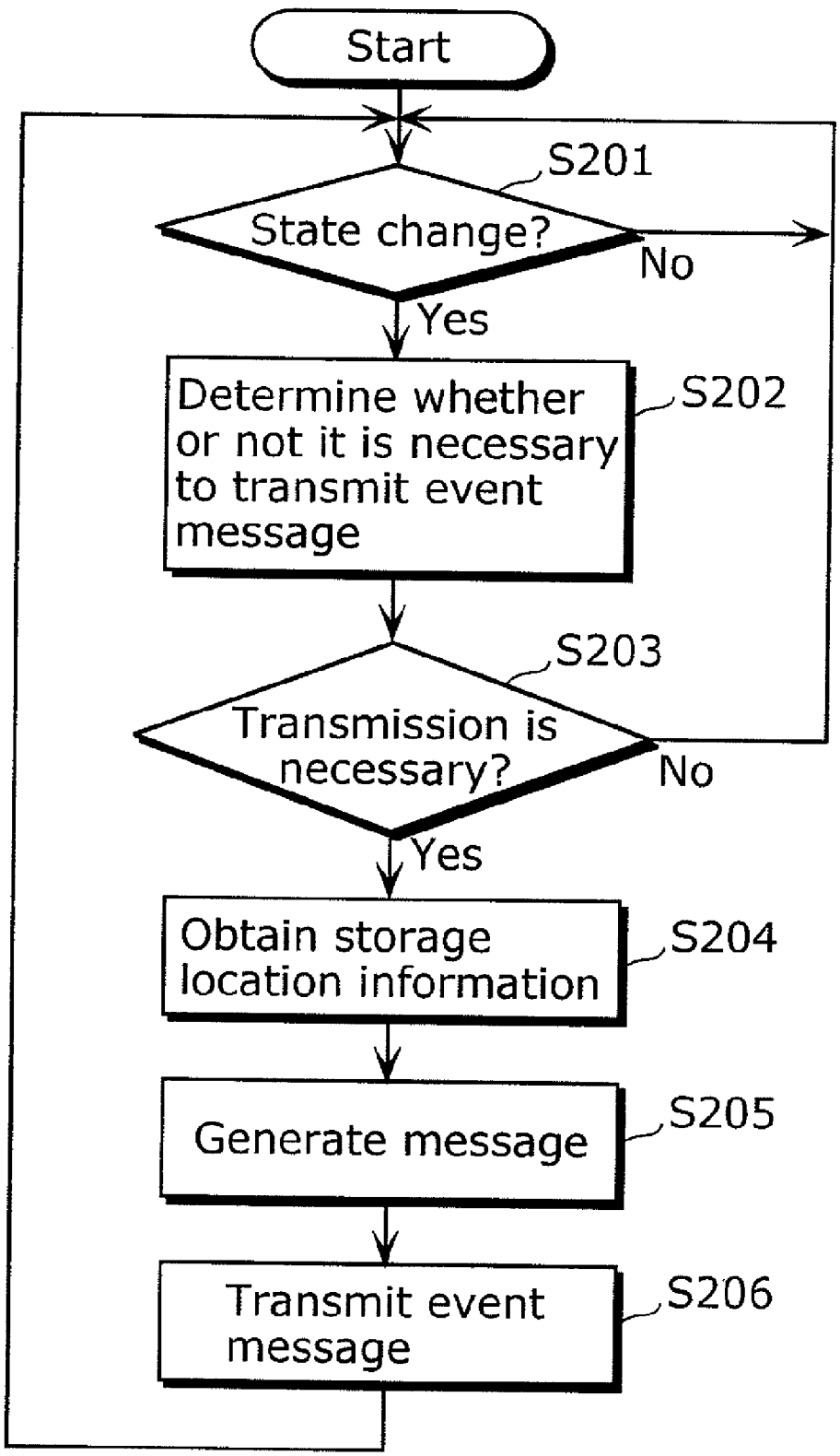
FIG. 7 shows a flowchart indicating a procedure of event transmission processing by the television according to Embodiment 1 in the present invention.

FIG. 7 shows a flowchart indicating the procedure of the event transmission processing by the intercom 103 or the NW camera 104. The processing to be described using the intercom 103 as an example will basically hold true for the processing by the NW camera 104.

First, the event message generating unit 132 detects a state change (occurrence of an event) in an apparatus included in the intercom system 110 via the own communication unit 138 (S201).

Next, the event message generating unit 132 determines whether or not it is necessary to transmit an event message corresponding to the occurring event, using the setting information set in the transmission event control unit 133, an event category of the event, an event type of the event, and others (S202).

FIG. 8 illustrates an example of a structure of setting information 300 held by the transmission event control unit 133.

As illustrated in FIG. 8, the setting information 300 includes an event category 311 that is a general category of an event, an event type 312 obtained by further dividing the event category 311 into sub-categories, and settings 313 and 314. The setting 313 and the setting 314 are set to the event category 311 and the event type 312, respectively, and each indicates whether or not to notify an event receiving apparatus of an event message when an event occurs. In other words, the user can set whether or not to notify the event message for each of the event categories 311 or for each of the event types 312.

As such, eliminating the need to transmit an event after specifying the event category 311 can prevent, from being transmitted, all event messages of the events of the event types 312 included in the same event category 311. Thereby, since the user does not need to set whether or not it is necessary to transmit an event in consideration of each of the event types 312, the convenience of the user will be improved.

For example, when the electric lock sensor 114 detects picking a lock, the event message generating unit 132 transmits the event message to an event receiving apparatus with reference to the setting information 300 in FIG. 8. When a call button in the entrance slave unit 111 is pressed, the event message generating unit 132 does not transmit the event message to an event receiving apparatus with reference to the same.

Although the presence or absence of notification of an event is set in each of the settings 313 and 314, the presence or absence of the notification may be set for one of the event type 312 and the event category 311.

Furthermore, whether or not it is necessary to transmit an event to be notified may be set according to a state of the user.

FIG. 9 illustrates an example of a structure of setting information 301 when whether or not it is necessary to transmit an event to be notified is set according to a state of the user.

As illustrated in FIG. 9, the user sets a state, such as "at home", "sleep", and "outing" as a user's state 315. Furthermore, the presence or absence of notification of an event is set in each setting 316 determined according to the user's state 315 and the event type 312. For example, in the case where "sleep" is set as the user's state 315, when the electric lock sensor 114 detects picking a lock, the event message generating unit 132 transmits the event message to an event receiving apparatus with reference to the setting information 301 in FIG. 9. When a call button in the entrance slave unit 111 is pressed, the event message generating unit 132 does not transmit the event message to an event receiving apparatus with reference to the same.

Although the presence or absence of notification of an event is set for each of the event types 312, the presence or absence of the notification of an event may be set for each of the event categories 311.

Next, when the event message generating unit 132 determines that transmission of an event message is not necessary (No in S203), the intercom 103 abandons information of a state change, and does not execute the event transmission processing by the next state change.

Next, when the event message generating unit 132 determines that transmission of an event message is necessary (Yes in S203), the intercom 103 performs the following processing. The information storage location obtaining unit 134 selects at least one of media according to an event category and an event type of the event obtained from the event message generating unit 132, and presents, to the event message generating unit 132, a storage location of a server unit to which event information of each of the selected media is provided. Thereby, the event message generating unit 132 obtains the storage locations of the event information of at least one of the media (S204).

Next, the event message generating unit 132 generates an event message including the storage locations of the obtained event information (S205), and transmits the generated event message to an event receiving apparatus through the communication unit 131 (S206).

Next, the event message generated by the event message generating unit 132 will be described with reference to FIGS. 10 to 13.

FIG. 10 illustrates an example of a structure of an event message 320 transmitted by the intercom 103 in a state change of the entrance slave unit 111. As illustrated in FIG. 10, the event message 320 includes a level 331, a message 332, a web URL 333, a device category 334, an event category 335, and mediaInfo 336.

The level 331 indicates importance of an event, and is categorized as "Alert", "Notice", and "Information". Here, "Alert" indicates the most important event, and "Information" indicates the least important event.

The message 332 is string information indicating details of an event.

The web URL 333 is information indicating a storage location of the event information provided by the web server unit 151. More specifically, the web URL 333 is an URL where the event information described in HTML is stored, and an event receiving apparatus accesses the URL indicated by the web URL 333 so that the event information can be obtained.

The device category 334 is information on an event transmitting apparatus that has transmitted the event message. The device category 334 is described as hierarchical information. As shown in FIG. 10, for example, the information on the event transmitting apparatus is hierarchically described in order as "Intercom", "entrance-slave-unit", and "ID" for uniquely identifying the entrance slave unit.

With the information on the event transmitting apparatus being hierarchically described, an event receiving apparatus can recognize information indicating that the intercom 103 has transmitted the event message even when it cannot recognize the entrance slave unit 111 that is detailed information. Thus, the event receiving apparatus can filter an event and so forth.

The event category 335 indicates an event category and an event type of an event. The event category 335 is also hierarchically described as the device category 334. For example, in the event category 335, a visitor event is described as an event category of an event, and more specifically, information that the entrance slave unit 111 has detected the visitor event is described.

With the information being hierarchically described, an event receiving apparatus can recognize the visitor event even when the event receiving apparatus cannot recognize the detection by the entrance slave unit 111 that is detailed information. Thus, the event receiving apparatus can filter an event and so forth.

The mediaInfo 336 includes a plurality of media information 341 to 343 each indicating a media type and a storage location of the event information. In the example in FIG. 10, the mediaInfo 336 includes the media information 341 that is audio (audio collected by a microphone of the entrance slave unit 111), the media information 342 that is Motion-JPEG video (video captured by a camera of the entrance slave unit 111), and the media information 343 that is MPEG4 video (video captured by a camera of the entrance slave unit 111).

Hereinafter, the description of the mediaInfo 336 will be described. A description on a medium is between "m=" and the next "m=". For example, "m=audio 6384 RTP/AVP" indicates that (1) the medium is audio, and that information can be obtained: (2) using an RTP; and (3) from a port number 6384. "a=G711" indicates that an audio codec is G711. "a=audiochannels=1" indicates that audio is monophonic. "a=ptime:20" indicates that audio data is transmitted at intervals of 20 milliseconds.

An event receiving apparatus can obtain information by analyzing the media information 341 and accessing the port number 6384 of the event transmitting apparatus using the RTP.

Furthermore, the next "m=video 8000 TCP" is information on another medium, (1) is video information, and information can be obtained: (2) using a Transmission Control Protocol (TCP), and (3) from a port number 8000. "a=M-JPEG" indicates that a codec of video is Motion-JPEG. "a=framesize=320×240" indicates that a frame size of video is 320 pixels×240 pixels. "a=framerate:15.000" indicates that a frame rate is 15 frames per second.

Furthermore, "a=uri:http://xxxx:8000/MotionJpeg?Resolution=320×240" indicates that information can be obtained by designating "http://xxxx:8000/MotionJpeg?Resolution=320×240" as a URL. In this case, the information can be obtained from a location indicated by "xxxx:8000/MotionJpeg?Resolution=320×240" using a HTTP protocol.

Since the same explanation can be applied to "m=video 6385 RTP/AVP" that is information on the media of MPEG4, the description is omitted.

With transmission of an event message including the plurality of media information 341 to 343 each indicating a media type and the storage location of event information, from the event transmitting apparatus, the event receiving apparatus can obtain the event information corresponding to a medium selected as the most suitable medium to the event receiving apparatus.

FIG. 11 illustrates an example of an event message 321 to be notified in a state change of the sensor camera 112 of the intercom system 110. Since the sensor camera 112 cannot obtain audio information, only a plurality of video media information 344 and 345 are described, and no audio media information is not described in the mediaInfo 336 included in the event message 321.

FIG. 12 illustrates an example of an event message 322 to be transmitted in a state change of the fire sensor 113. Since the fire sensor 113 can obtain neither video media information nor audio media information, only information of the web URL 333 is included in the event message 322.

FIG. 13 illustrates an example of an event message 323 to be notified when a sensor of the NW camera 104 detects a state change. For example, audio media information 346, two video media information 347 and 348 having different M-JPEG resolutions, and MPEG4 video media information 349 are described in the mediaInfo 336 included in the event message 323.

As such, each of a plurality of media information included in the web URL 333 and the mediaInfo 336 includes a media type (e.g., video, a still image, or audio), a transmission method (e.g., information for a browser, RTP, or TCP), a storage location of event information (e.g., URL or a port number), and a format. Here, the format includes a compression method and a codec. When a media type is video, the format further includes a pixel size (frame size) and a frame rate. When a media type is a still image, the format further includes a pixel size. When a media type is audio, the format further includes the number of channels (e.g., mono and stereo) and transmission intervals of audio data.

Furthermore, since the kinds and counts of media of event information vary according to event categories and event types of events, the information storage location obtaining unit 134 needs to select event information that should be included in an event message according to the event categories and the event types of the events, and determine an information source (storage location) of the selected event information.

FIG. 14 illustrates correspondences between the event types and information sources (storage locations) of event information in the intercom 103. Furthermore, FIG. 15 illustrates correspondences between the event types and information sources (storage locations) of the event information in the NW camera 104. The information storage location obtaining unit 134 determines an information source 317 associated with the event type 312 with reference to the tables in FIGS. 14 and 15.

Next, the processes (S105 to S107 in FIG. 6) when an event receiving apparatus receives an event will be described.

Figure 16:
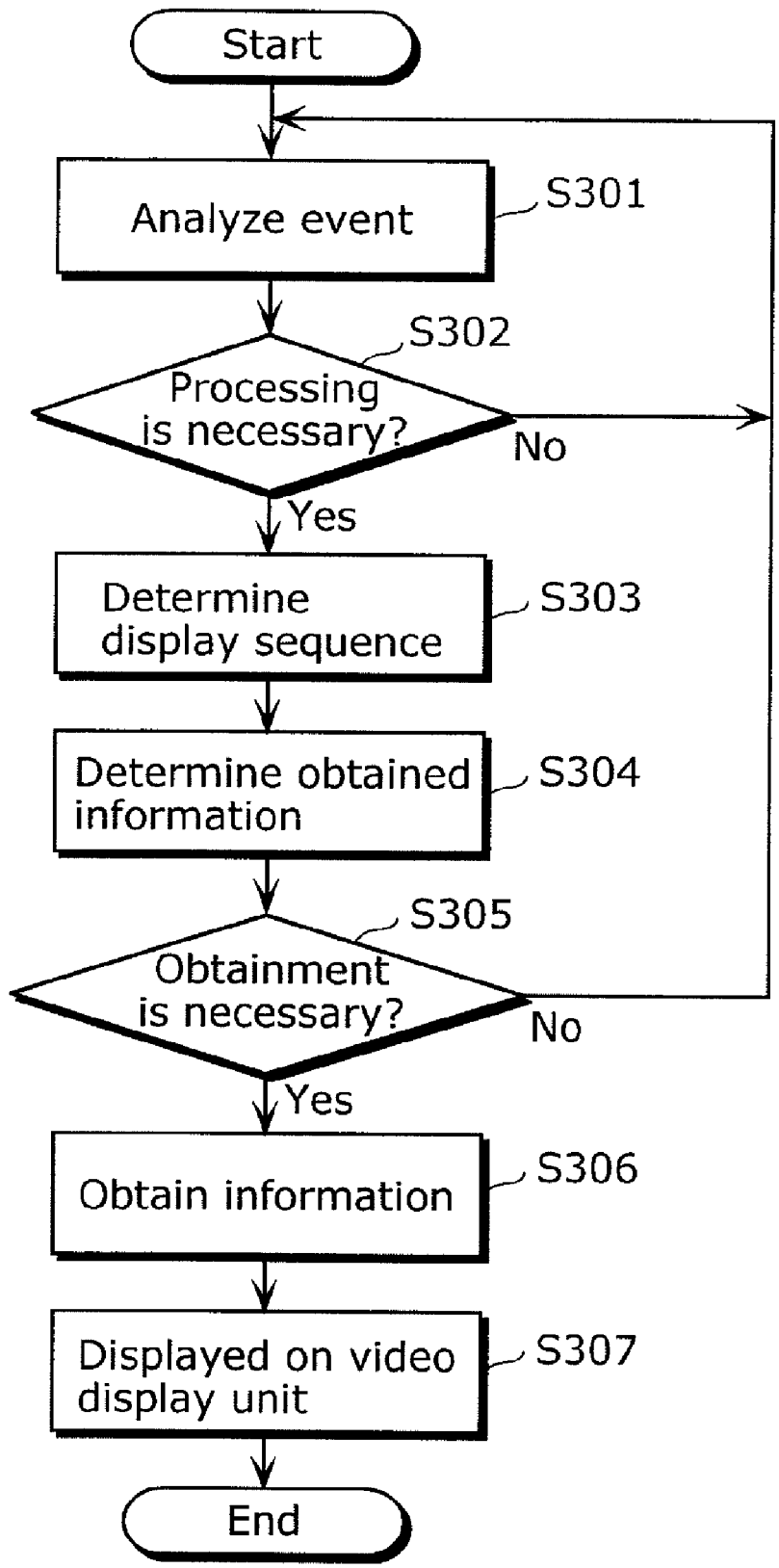
FIG. 16 shows a flowchart indicating a procedure when the television according to Embodiment 1 in the present invention receives an event.

FIG. 16 shows a flowchart indicating a processing procedure when the television 101 receives an event message.

When the communication unit 211 receives an event message, the event analyzing unit 212 analyzes the event message and extracts information elements (the level 331, the message 332, the web URL 333, the device category 334, the event category 335, and the mediaInfo 336) that are included in the event message (S301).

Next, the event analyzing unit 212 determines whether or not to continue to process the event message based on the setting information 300 held by the received-event control unit 213 and the information elements extracted from the event message (S302). For example, the setting information 300 has the same structure as the setting information 300 in FIG. 8.

Here, whether or not it is necessary to process the event message may be set according to a state of the user. In other words, the received-event control unit 213 may determine whether or not it is necessary to process the event message according to a state of the user, using the setting information 301 in FIG. 9. More specifically, the presence or absence of notification shown in the settings 313, 314, and 316 in FIGS. 8 and 9 needs to be replaced with the presence or absence of processing the event message. Here, processing the event message includes obtaining event information and displaying the event information (video and web sites) (output of audio when the event information is audio).

More specifically, the event analyzing unit 212 determines whether or not to continue to process the event message, according to the setting 313 or 314 in the setting information 300. Here, the setting 313 and the setting 314 correspond to the event category 311 and the event type 312 indicated in the event category 335, respectively. Alternatively, when the setting information 301 in FIG. 9 is used, the event analyzing unit 212 obtains the user's state 315 that has been set ("at home", "sleep", and "outing"), and determines whether or not to continue to process the event message, according to the obtained user's state 315 and the setting 316 in the setting information 301. The setting 316 corresponds to the event category 311 or the event type 312 indicated in the event category 335.

When processing the event message is not necessary (No in S302), the television 101 abandons the received event message, and waits for the next event message.

On the other hand, when processing the event message is necessary (Yes in S302), the event analyzing unit 212 transfers the information elements included in the event message to the display sequence control unit 214. The display sequence control unit 214 determines whether or not to display string information of the message 332, according to predetermined details.

The predetermined details are information indicating whether or not it is necessary to display the message 332 for each of the event categories 311 or for each of the event types 312. The display sequence control unit 214 displays the message 332 according to details of the setting corresponding to the event category 311 or the event type 312 indicated in the event category 335.

When a condition "obtaining event information after displaying the message 332" is set, the display sequence control unit 214 causes the video display unit 217 to display the string information described in the message 332, and inquires of the user about whether or not to obtain the event information.

Figure 17:
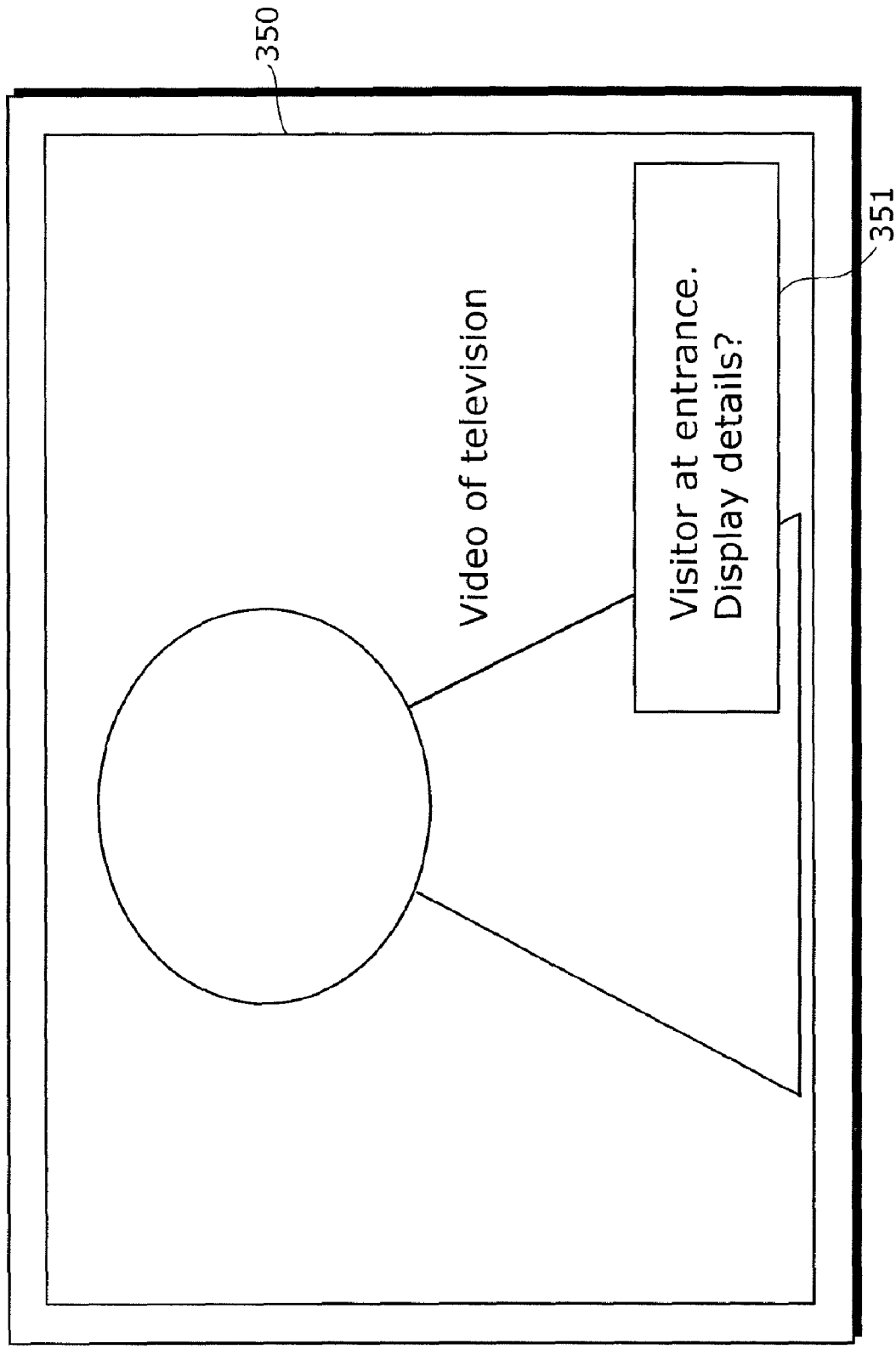
FIG. 17 illustrates an example of displaying an event by the television according to Embodiment 1 in the present invention.

FIG. 17 illustrates a display example of the video display unit 217. As illustrated in FIG. 17, the video display unit 217 displays a message 351 overlaid on television broadcast video 350.

The control on a display sequence enables promptly displaying the event information in response to a request from the user, and also obtaining event information necessary for the user while displaying it without disturbing the user to view a television broadcast.

Although the display sequence control unit 214 determines whether or not to display the string information of the message 332, according to predetermined details herein, it may switch between display sequences using information included in an event message. More specifically, the display sequence control unit 214 may switch between display sequences, according to e.g., (i) whether or not the mediaInfo 336 includes media information of a specific media type, (ii) an event category and an event type indicated in the event category 335, or (iii) the level 331.

When obtaining event information is instructed through a user operation or when a condition "immediately obtaining event information" is set, the obtained information determining unit 215 determines a medium of the event information to be obtained using the media type indicated in the mediaInfo 336 included in an event message (S304).

FIG. 18 illustrates an example of a table indicating correspondences between (i) the event category 311, the event type 312, and an event-receiving-apparatus type 318 and (ii) available information sources 319.

The obtained information determining unit 215 selects a corresponding one of the information sources 319 of an media type determined according to the event category 311, the event type 312, and the event-receiving-apparatus type 318 with reference to the table in FIG. 18. In other words, the obtained information determining unit 215 selects a predetermined media type from among the media types that can be processed by the event receiving apparatus.

For example, the obtained information determining unit 215 determines to obtain the event information indicated in the web URL 333, when the event receiving apparatus is a television receiver that is only capable of performing display using a browser. Furthermore, the obtained information determining unit 215 determines whether or not media information of the mediaInfo 336 includes video of MPEG4 when the event receiving apparatus is a television receiver that is capable of reproducing the video of MPEG4, and determines to obtain the video of MPEG4. Furthermore, when the event receiving apparatus is also capable of reproducing audio, it simultaneously determines whether or not the mediaInfo 336 includes audio media information, and determines to obtain the audio when the mediaInfo 336 includes the audio media information.

When obtaining the event message is not necessary (No in S305), the television 101 waits for the next event message.

On the other hand, when obtaining the event message is necessary (Yes in S305), next, the information obtaining control unit 216 obtains the event information using the information source determined by the obtained information determining unit 215 (S306). More specifically, the obtained information determining unit 215 obtains the event information by transmitting an event information obtainment request including the source information specifying the information source to an event transmitting apparatus. Here, the source information is information for specifying a port number and a protocol.

For example in the example of the event message in FIG. 10, the obtained information determining unit 215 requests an event transmitting apparatus to transmit audio event information by transmitting an event information obtainment request for specifying the port number 6384 and the protocol RTP. Furthermore, the obtained information determining unit 215 requests an event transmitting apparatus to transmit event information of MPEG4 by transmitting an event information obtainment request for specifying the port number 6385 and the protocol RTP. Furthermore, the obtained information determining unit 215 requests an event transmitting apparatus to transmit event information of M-JPEG by transmitting an event information obtainment request for specifying the port number TCP. Furthermore, the obtained information determining unit 215 requests an event transmitting apparatus to transmit web event information by transmitting an event information obtainment request for specifying the port number 80 and the protocol HTTP.

Next, the video display unit 217 displays the event information obtained by the information obtaining control unit 216 (S307).

Figure 19:
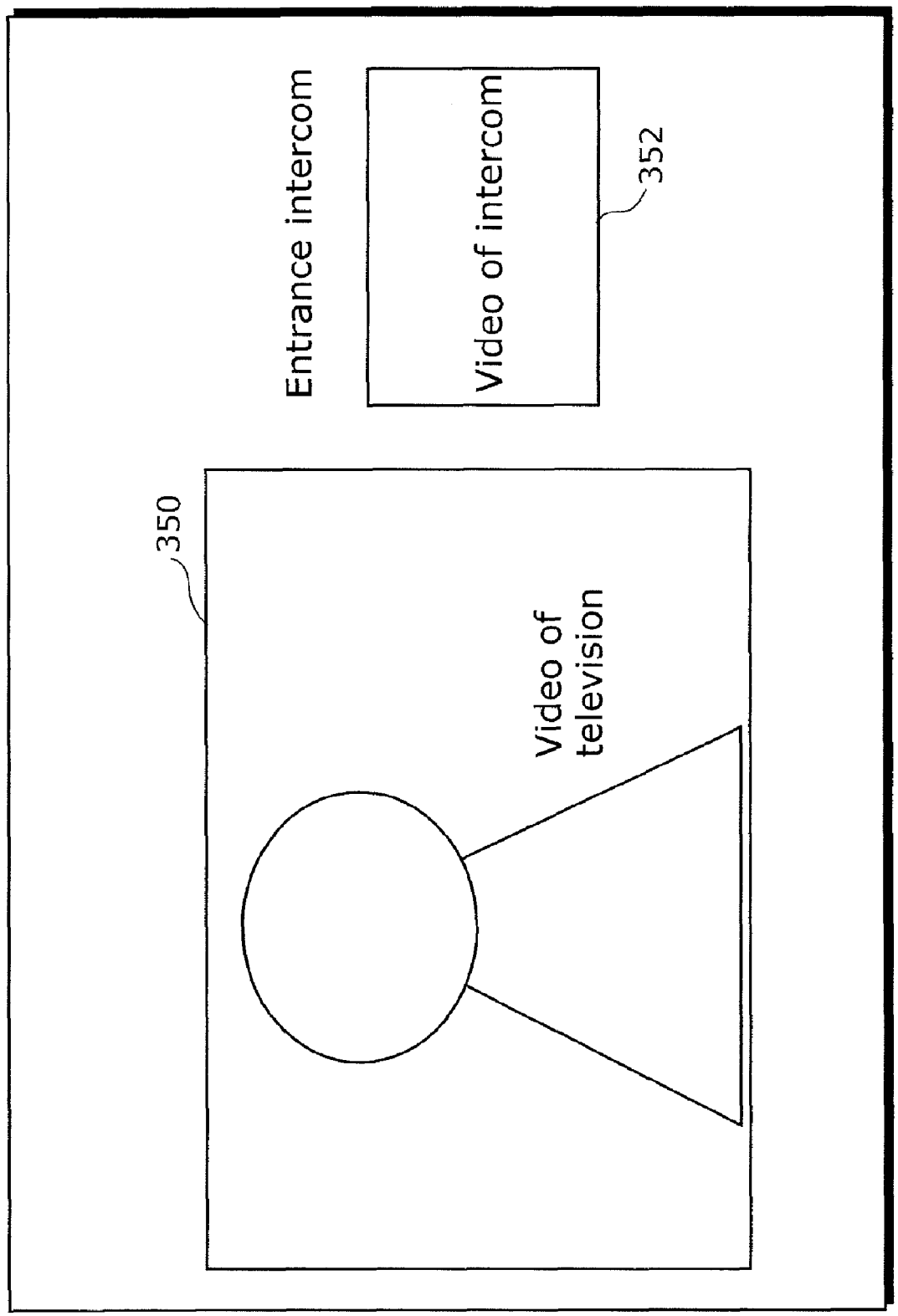
FIG. 19 illustrates an example of displaying event information by the television according to Embodiment 1 in the present invention.

FIG. 19 illustrates a display example of event information. As illustrated in FIG. 19, the video display unit 217 displays the television broadcast video 350 and event information 352 that is video of an intercom.

As such, the video display unit 217 can simultaneously display the television broadcast video 350 that is being viewed and the event information 352 with a double screen function or a picture-in-picture display.

Next, the processes when the recorder 102 receives an event will be described with reference to FIG. 20.

Figure 20:
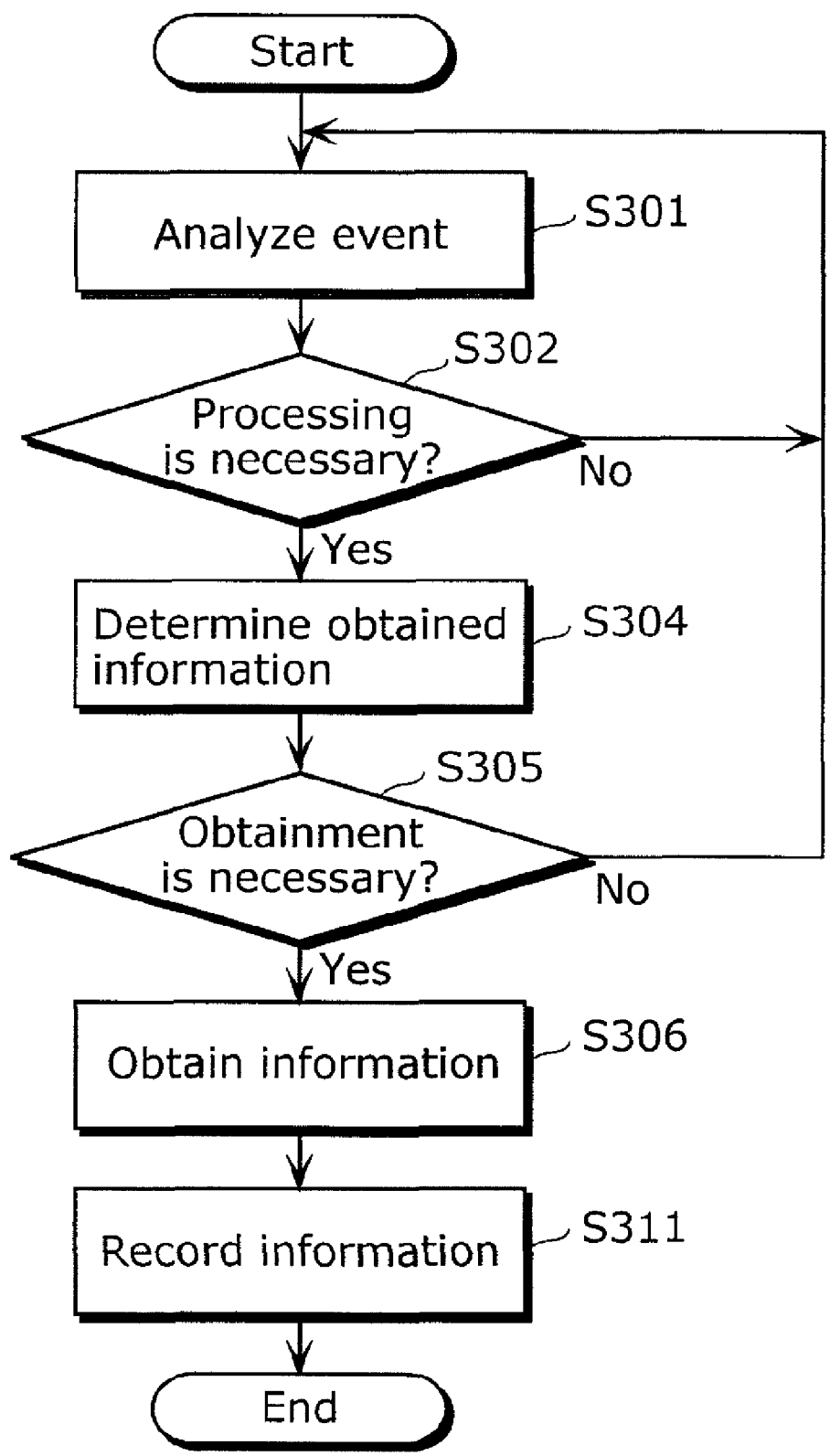
FIG. 20 shows a flowchart indicating a processing procedure when the recorder according to Embodiment 1 in the present invention receives an event.

FIG. 20 shows a flowchart indicating a procedure when the recorder 102 receives an event. The processes in both FIGS. 16 and 20 are numbered by the same numerals, and thus the descriptions are omitted hereinafter. The difference from FIG. 16 is that no process of determining a display sequence (S303) is included in FIG. 20 and that the information recording/reproducing unit 221 records the event information obtained by the information obtaining control unit 216 (S311).

Furthermore, FIG. 21 illustrates an example of a structure of setting information 302 of the recorder 102 in the case where whether or not it is necessary to perform a process is set according to a state of the user.

As illustrated in FIG. 21, the user sets a state, such as "at home", "sleep", and "outing" as the user's state 315. Furthermore, the presence or absence of and the kind of the process are set in the setting 316 to be determined, according to the user's state 315 and the event type 312. For example, when the "outing" is set as the user's state 315 and the electric lock sensor 114 detects picking a lock, the event analyzing unit 212 determines to record character information included in the event information with reference to the setting information 302 in FIG. 21. When the fire sensor 113 detects a fire, the event analyzing unit 212 determines not to record character information and video that are included in the event information with reference to the setting information 302 in FIG. 21. When a call button in the entrance slave unit 111 is pressed, the event analyzing unit 212 determines to record video included in the event information with reference to the setting information 302 in FIG. 21.

Next, the transmission of event information by an event transmitting apparatus (S105 and S106 in FIG. 6) will be described with reference to FIG. 22.

Figure 22:
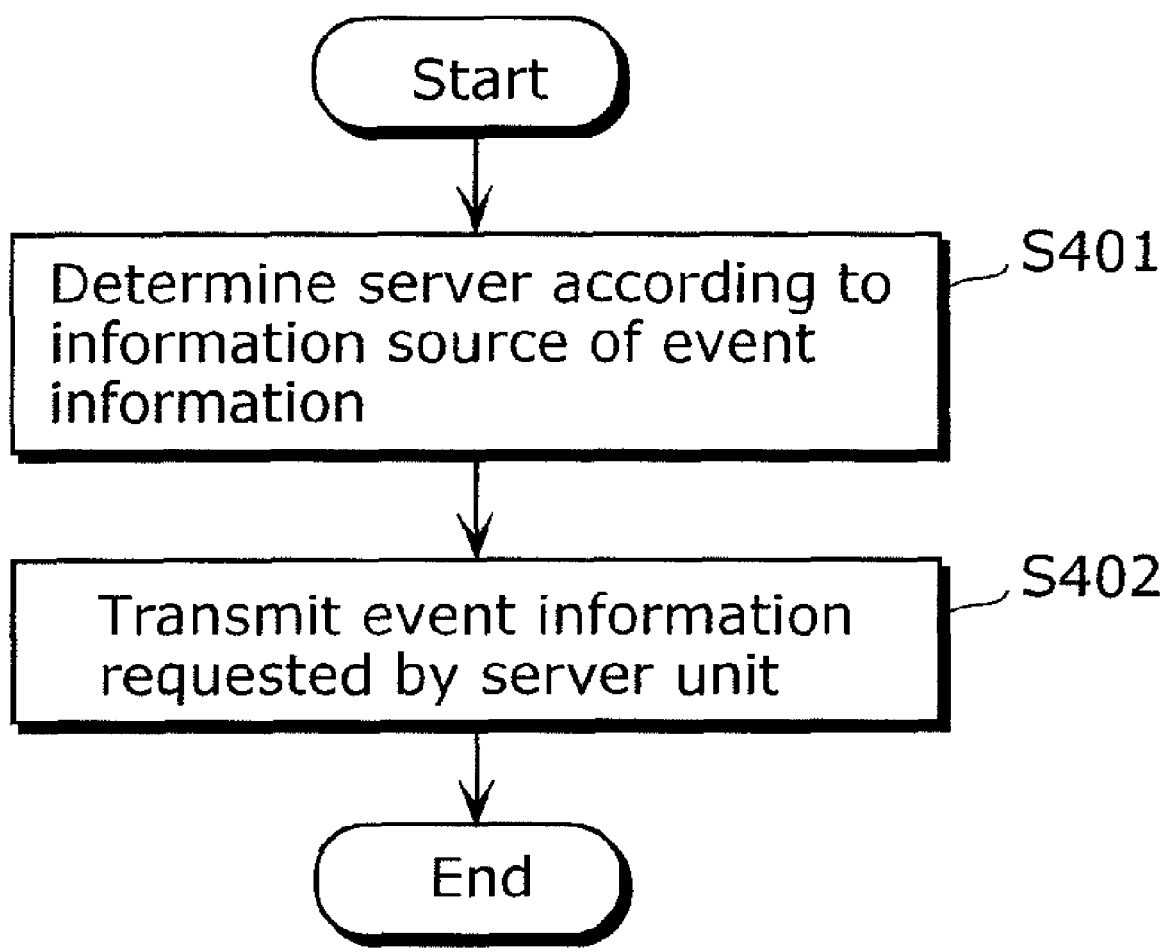
FIG. 22 shows a flowchart indicating a processing procedure when the intercom according to Embodiment 1 in the present invention receives an event information obtainment request.

FIG. 22 shows a flowchart indicating the procedure of the transmission of event information by the intercom 103.

First, the server unit 135 receives an event information obtainment request transmitted by an event receiving apparatus, through the communication unit 131. The server unit 135 determines one of the server units 151 to 154 to be processed, according to source information included in the received event information obtainment request (S401).

Hereinafter, a method for determining a server unit to be processed will be described using the event message in FIG. 10 as an example. First, the server unit 135 checks a port number and a protocol included in the source information. The server unit 135 selects the audio information server unit 154 when the port number is 6384 and the protocol is RTP.

Similarly, the server unit 135 selects the MPEG server unit 153 when the port number is 6385 and the protocol is RTP, and selects the Motion-JPEG server unit 152 when the port number is 80 and the protocol is HTTP.

Next, one of the server units 151 to 154 selected by the server unit 135 transmits event information to an event receiving apparatus that has transmitted the event information obtainment request (S402).

As described above, the event transmitting apparatus according to Embodiment 1 in the present invention transmits information indicating types of media transmittable by the event transmitting apparatus and an event message including a storage location of event information of each of the media, to an event receiving apparatus. Thereby, an event receiving apparatus can select a medium suitable for the event receiving apparatus and obtain event information of the selected medium. Furthermore, the event transmitting apparatus can present event information of a suitable medium to an event receiving apparatus.

Although the communication system according to Embodiment 1 in the present invention is described hereinbefore, the present invention is not limited to such an embodiment.

For example, although an event transmitting apparatus determines whether or not it is necessary to transmit an event (S202), and further an event receiving apparatus determines whether or not it is necessary to process the event (S302) in the description, instead, only one of the processes may be performed.

Furthermore, although an event receiving apparatus obtains event information from an event transmitting apparatus that is a transmission source of an event message in the description, the event receiving apparatus may obtain event information from a communication device (server device) other than the event transmitting apparatus. In other words, the storage location of the event information of each of the media that is included in the event message transmitted by the event transmitting apparatus may designate the server device other than the event transmitting apparatus. In such a case, the server device has only to include the constituent elements of the server unit 135, and to transmit event information to the event receiving apparatus in response to a request from the event receiving apparatus.

Furthermore, the functions of each processing unit in FIGS. 2 to 5 are implemented by a processor, such as a CPU that executes a program or by a dedicated circuit (hardware).

Embodiment 2

A subscription request and a subscription response (S101 and S102 in FIG. 6) will be described in detail in Embodiment 2 in the present invention.

In the conventional communication system, an event transmitting apparatus cannot determine whether or not an event receiving apparatus that is requesting a subscription is an authentic apparatus upon receipt of the subscription request. In other words, the event transmitting apparatus has no means to determine whether or not it is necessary to accept the subscription request.

Generally, the event transmitting apparatus limits the number of event receiving apparatuses from which the event transmitting apparatus can accept subscription requests. Thus, there is a problem that the event transmitting apparatus cannot accept a subscription request from an authentic event receiving apparatus desired to interact with each other, when the event transmitting apparatus accepts subscription requests from any event receiving apparatuses without determining the validity of the event receiving apparatuses.

Furthermore, simultaneous transmission of an event message from an event transmitting apparatus to event receiving apparatuses through broadcasting or multicasting leads to transmission of the event message to event receiving apparatuses and event transmitting apparatuses to be excluded from the interaction. In other words, there is a problem that the apparatuses to be excluded from the interaction need unnecessary packet analysis and know a status of the event transmitting apparatus.

In response, the communication system 100 according to Embodiment 2 in the present invention shares authentication information between an event receiving apparatus and an event transmitting apparatus before the subscription. Furthermore, the event receiving apparatus transmits a subscription request message including the authentication information to the event transmitting apparatus.

Thereby, the event transmitting apparatus verifies the authentication information included in the subscription request message so that it can determine whether or not the event receiving apparatus that is a transmission source of the subscription request message is an authentic event receiving apparatus. Thus, the event transmitting apparatus can accept a subscription request only from the authentic event receiving apparatus desired to interact with each other.

First, the communication system 100 according to Embodiment 2 in the present invention will be described. Since the configuration of the communication system 100 is the same as illustrated in FIG. 1 and the functional configurations of the television 101 and the intercom 103 are the same as illustrated in FIGS. 4 and 3, and thus the descriptions are omitted hereinafter. Furthermore, although the television 101 as an event receiving apparatus and the intercom 103 as an event transmitting apparatus are used as an example herein, a case where the event receiving apparatuses are the recorder 102 and the controller 107 and a case where the event transmitting apparatuses are the NW camera 104, the home gateway 105, and the air conditioner 106 may be applied instead.

Figure 23:
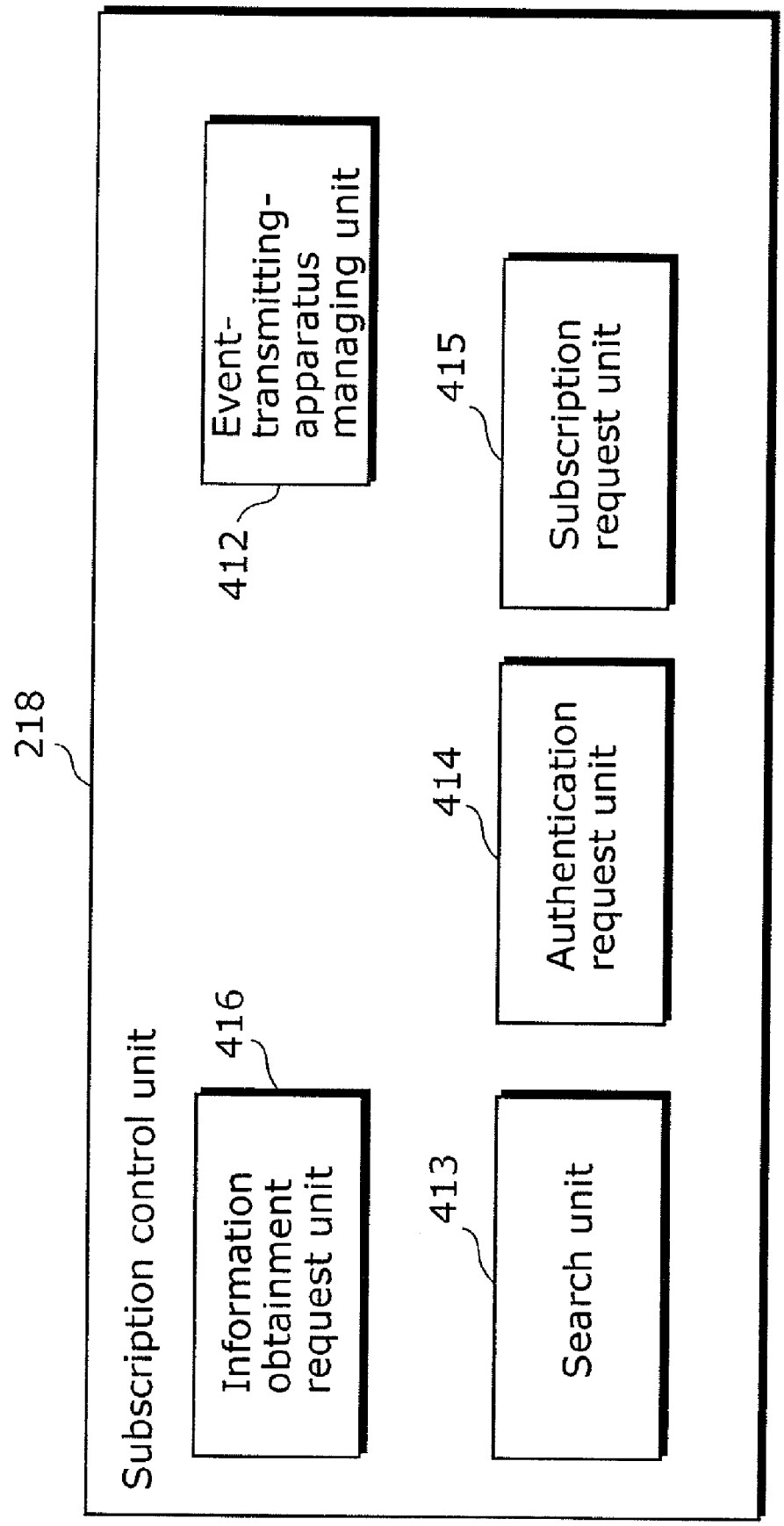
FIG. 23 illustrates a block diagram of a configuration of a subscription control unit included in a television according to Embodiment 2 in the present invention.

FIG. 23 illustrates a block diagram of a functional configuration of the subscription control unit 218 included in an event receiving apparatus according to Embodiment 2 in the present invention. As illustrated in FIG. 23, the subscription control unit 218 includes an event-transmitting-apparatus managing unit 412, a search unit 413, an authentication request unit 414, a subscription request unit 415, and an information obtainment request unit 416.

The search unit 413 searches for an event transmitting apparatus connected to the network 120 by transmitting a search request message to apparatuses connected to the network 120 through the communication unit 131. Furthermore, the search unit 413 searches for an event transmitting apparatus on a regular basis or using an upper-level application including a user operation as a trigger.

The information obtainment request unit 416 transmits an information obtainment request message for obtaining apparatus information of an event transmitting apparatus, to the event transmitting apparatus. Here, the apparatus information includes a name, a unique ID, model information, and an IP address of an event transmitting apparatus.

The authentication request unit 414 transmits, to an event transmitting apparatus, an authentication request message for requesting an event receiving apparatus to share the authentication information with the event transmitting apparatus, when an event transmitting apparatus is newly searched, when apparatus information of an event transmitting apparatus that has been already registered is updated, or with a trigger from the upper-level application including the user operation.

Here, the authentication information is information for authenticating an apparatus that is a transmission source of a message as an authentic apparatus. More specifically, the authentication information includes at least one of (i) a unique ID unique to each event receiving apparatus, (ii) a password for authentication between an event receiving apparatus and an event transmitting apparatus, and (iii) a user ID. Furthermore, the unique ID is an ID uniquely indicating an event receiving apparatus or an ID for internally managing an event receiving apparatus. The password is an ID unrelated to information unique to an event transmitting apparatus and an event receiving apparatus.

Furthermore, sharing authentication information means that an event transmitting apparatus determines whether or not an event receiving apparatus that is a transmission source of an authentication request message is an authentic apparatus, and that the event transmitting apparatus manages the authentication information in association with the event receiving apparatus when determining that the event receiving apparatus is the authentic apparatus.

The subscription request unit 415 transmits, to an event transmitting apparatus, a subscription request message for requesting the event transmitting apparatus to transmit an event message to the event receiving apparatus. The subscription request message includes authentication information.

The event-transmitting-apparatus managing unit 412 manages apparatus information of an event transmitting apparatus. More specifically, the event-transmitting-apparatus managing unit 412 stores a management table for managing a name, a unique ID, model information, an IP address, an apparatus-information access destination, an authentication-request access destination, and a subscription-request access destination of an event transmitting apparatus. Here, the model information includes a name of a manufacturer, a product number, a production date, and a serial number. The apparatus-information access destination, the authentication-request access destination, and the subscription-request access destination will be described later.

The event-transmitting-apparatus managing unit 412 updates the management table each time the event-transmitting-apparatus managing unit 412 receives a search response message, a network connection notification message, a network disconnection notification message, and an information obtainment response message.

Furthermore, when receiving the search response message and when receiving the network connection notification message, the event-transmitting-apparatus managing unit 412 checks an unique ID of the event transmitting apparatus. When the management table does not include information of the event transmitting apparatus, the event-transmitting-apparatus managing unit 412 determines the event transmitting apparatus as an new event transmitting apparatus, and requests the information obtainment request unit 416 to obtain the apparatus information of the event transmitting apparatus.

Furthermore, when receiving the search response message and when receiving the network connection notification message, upon detection of change in the apparatus-information access destination, the event-transmitting-apparatus managing unit 412 determines that the apparatus information of the event transmitting apparatus has changed, and requests the information obtainment request unit 416 to obtain the apparatus information of the event transmitting apparatus.

Figure 24:
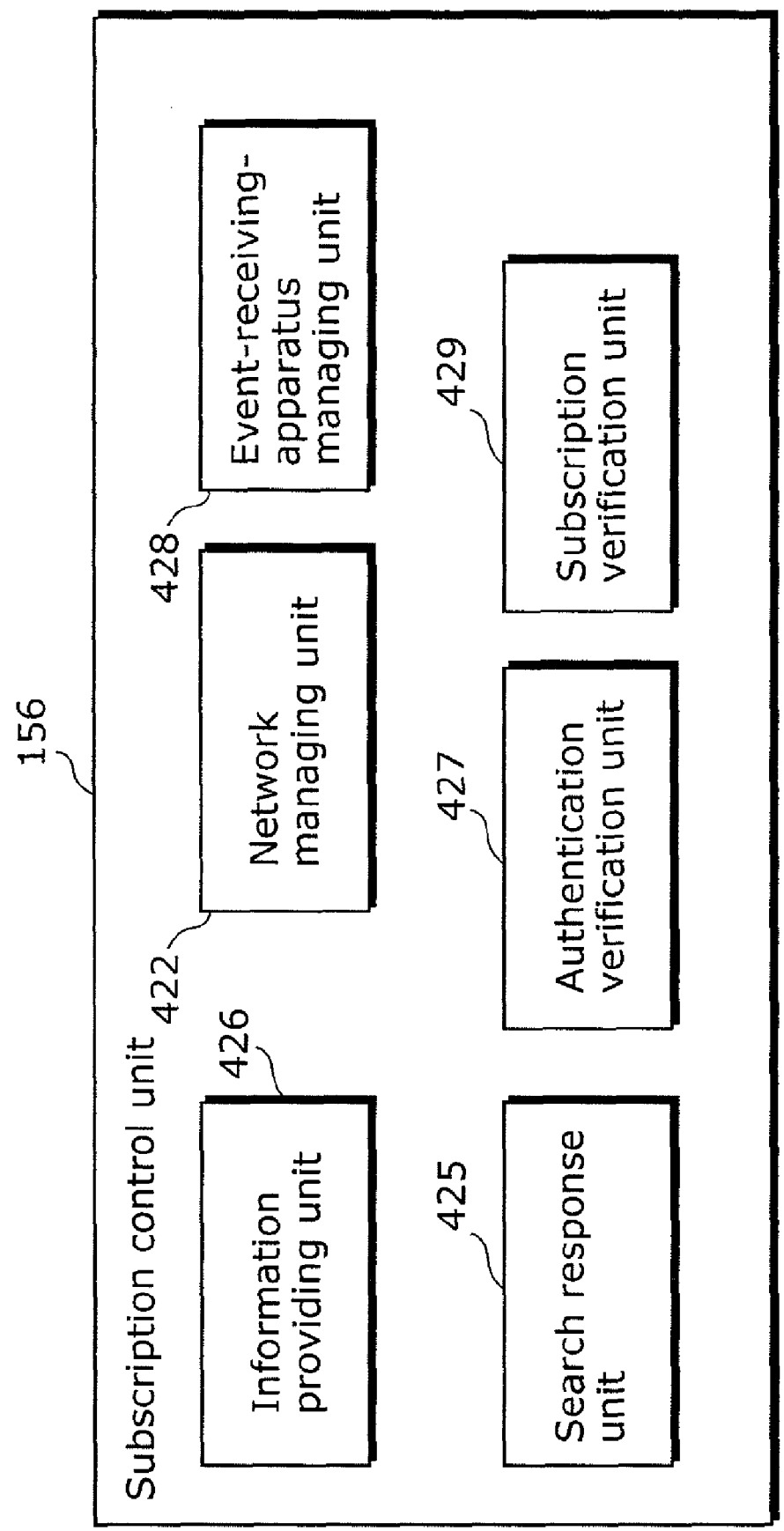
FIG. 24 illustrates a block diagram of a configuration of a subscription control unit included in an intercom according to Embodiment 2 in the present invention.

FIG. 24 illustrates a block diagram of a functional configuration of the subscription control unit 156 included in an event transmitting apparatus according to Embodiment 2 in the present invention. As illustrated in FIG. 24, the subscription control unit 156 includes a network managing unit 422, a search response unit 425, an information providing unit 426, an authentication verification unit 427, an event-receiving-apparatus managing unit 428, and a subscription verification unit 429.

The network managing unit 422 transmits a network connection notification message or a network disconnection notification message to an event receiving apparatus, when the event transmitting apparatus is connected to a network, changes the apparatus information, and is disconnected from a network.

The search response unit 425 determines whether or not the event transmitting apparatus satisfies a search condition included in a search request message received by the communication unit 131. The search response unit 425 transmits a search response message to an event receiving apparatus that is a transmission source of the search request message, when the event transmitting apparatus satisfies the search condition.

The information providing unit 426 transmits an information obtainment response message to an event receiving apparatus that is a transmission source of an information obtainment request message, when the communication unit 131 receives the information obtainment request message.

Furthermore, each time apparatus information of the event transmitting apparatus is changed, the information providing unit 426 changes an apparatus-information access destination of the event transmitting apparatus, notifies the search response unit 425 of the change, and requests the network managing unit 422 to transmit a network disconnection notification message and a network reconnection notification message.

The authentication verification unit 427 shares authentication information between the event transmitting apparatus and an event receiving apparatus that is a transmission source of an authentication request message, when the communication unit 131 receives the authentication request message. More specifically, the authentication verification unit 427 transmits the authentication response message including authentication information to be shared and a result of success and failure of an authentication, to the event receiving apparatus that is the transmission source of the authentication request message through the communication unit 131 after determining whether or not to be authenticated.

The event-receiving-apparatus managing unit 428 manages authentication information (an unique ID) shared with the event receiving apparatus.

The subscription verification unit 429 accepts a subscription request when the subscription request message transmitted by an event receiving apparatus includes the shared authentication information (an unique ID of the event receiving apparatus). In contrast, the subscription verification unit 429 does not accept a subscription request when the subscription request message does not include the shared authentication information. Furthermore, the subscription verification unit 429 transmits an authentication response message including a result of success and failure of the subscription to an event receiving apparatus that is a transmission source of the subscription request message, through the communication unit 131.

More specifically, the subscription verification unit 429 extracts a unique ID of the event receiving apparatus from event transmission destination information included in the subscription request message, and checks whether or not the extracted unique ID is a unique ID managed by the event-receiving-apparatus managing unit 428. When the unique ID is a unique ID managed by the event-receiving-apparatus managing unit 428, the subscription verification unit 429 transmits a subscription response message indicating the acceptance of the subscription to the event receiving apparatus that is the transmission source of the subscription request message. When the unique ID is not a unique ID managed by the event-receiving-apparatus managing unit 428, the subscription verification unit 429 transmits a subscription response message indicating no acceptance of the subscription to the event receiving apparatus that is the transmission source of the subscription request message.

Next, operations of the communication system 100 according to Embodiment 2 in the present invention will be described.

First, processes from search of an event transmitting apparatus by an event receiving apparatus to performing subscription processing will be described.

Figure 25:
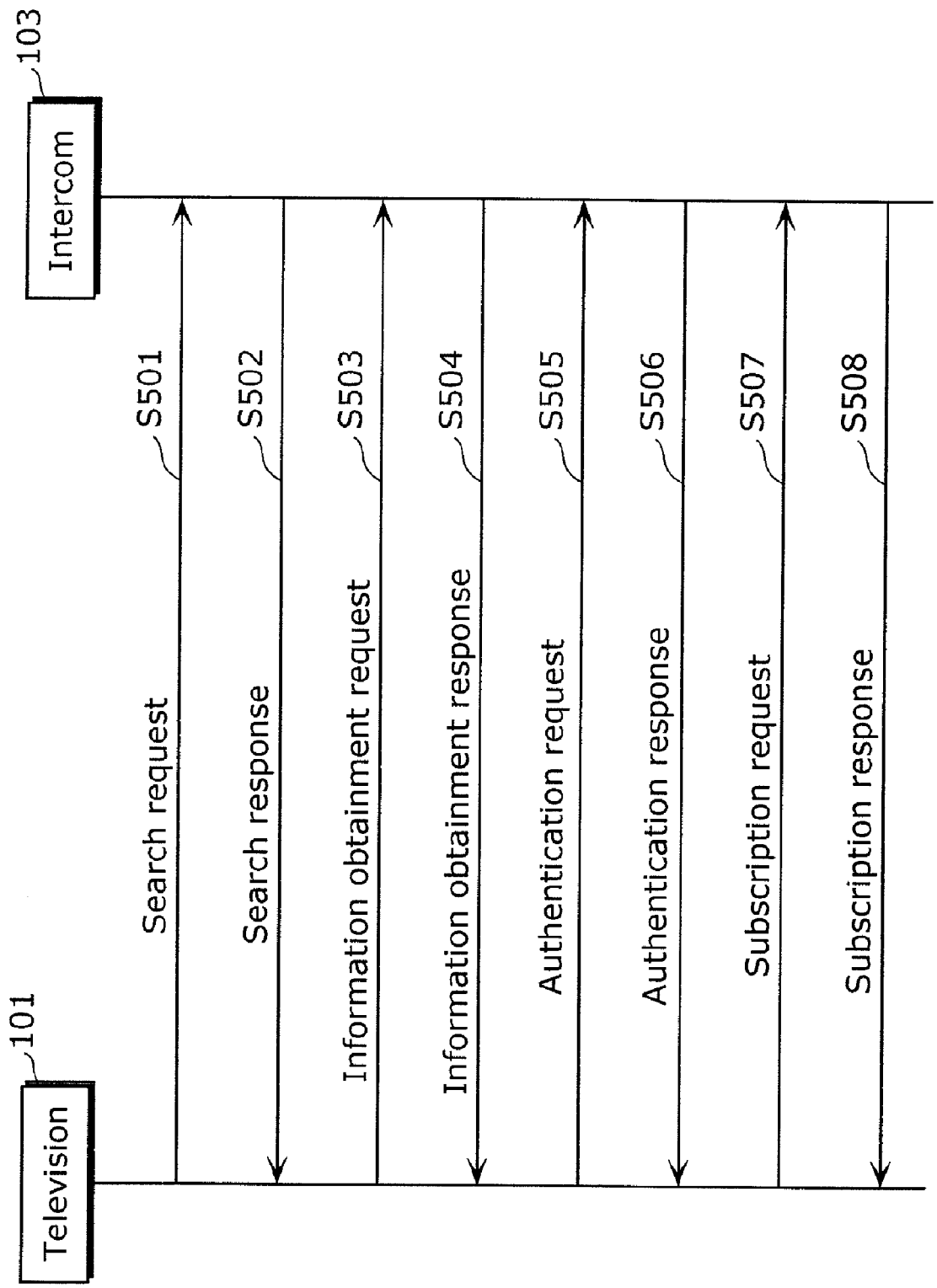
FIG. 25 illustrates a procedure of subscription processing by a communication system according to Embodiment 2 in the present invention.

FIG. 25 shows a processing procedure from search of the intercom 103 by the television 101 to performing the subscription processing on the intercom 103.

First, the search unit 413 of the television 101 transmits a search request message through broadcasting or multicasting (S501). The search request message includes a search condition and transmission source information indicating the event receiving apparatus that is a transmission source of the search request message. More specifically, the transmission source information is a unique ID of an event transmitting apparatus. Furthermore, the search condition is whether or not an apparatus that has received the search request message is an event transmitting apparatus.

The search response unit 425 of the intercom 103 that has received the search request message transmits a search response message to the television 101 when the intercom 103 satisfies the search condition included in the search request message (S502). More specifically, the search response unit 425 transmits the search response message to an event receiving apparatus indicated in the transmission source information included in the search request message, using a unicast connection. Furthermore, the search response message includes an apparatus-information access destination that is a transmission destination of an information obtainment response message.

The event-transmitting-apparatus managing unit 412 of the television 101 that has received the search response message adds a unique ID of the intercom 103 included in the search response message and the apparatus-information access destination to the management table. Furthermore, the information obtainment request unit 416 transmits the information obtainment request message to the intercom 103 using a unicast connection (S503). More specifically, the information obtainment request unit 416 transmits the information obtainment request message to the apparatus-information access destination included in the search response message.

The information providing unit 426 of the intercom 103 that has received the information obtainment request message transmits an information obtainment response message to the television 101 (S504). The information obtainment response message includes an authentication-request access destination that is a transmission destination of an authentication request message, and a subscription-request access destination that is a transmission destination of a subscription request message.

The event-transmitting-apparatus managing unit 412 of the television 101 that has received the information obtainment response message adds the authentication-request access destination included in the information obtainment response message and the subscription-request access destination to the management table. Furthermore, the authentication request unit 414 transmits the authentication request message to the intercom 103 (S505). More specifically, the authentication request unit 414 transmits the authentication request message to the authentication-request access destination included in the information obtainment response message. The authentication request message includes authentication information to be shared between an event receiving apparatus and an event transmitting apparatus, and a model of the event receiving apparatus. Here, the model is a type of an event receiving apparatus, such as a controller, a DVD recorder, and a television.

The model of an event receiving apparatus may further include at least one of a name of a manufacturer, a product number, a production date, and a serial number. Furthermore, the authentication request message may include at least one of: information indicating one of an encryption method and a hash value calculating algorithm; and information indicating whether the authentication information to be transmitted by the event receiving apparatus has already been shared between the event receiving apparatus and another event transmitting apparatus or indicates an initial value (is not shared with another event transmitting apparatus).

The authentication verification unit 427 of the intercom 103 that has received the authentication request message determines whether or not to be able to accept the authentication request, according to the authentication information included in the authentication request message and a model of the event receiving apparatus.

Figure 26:
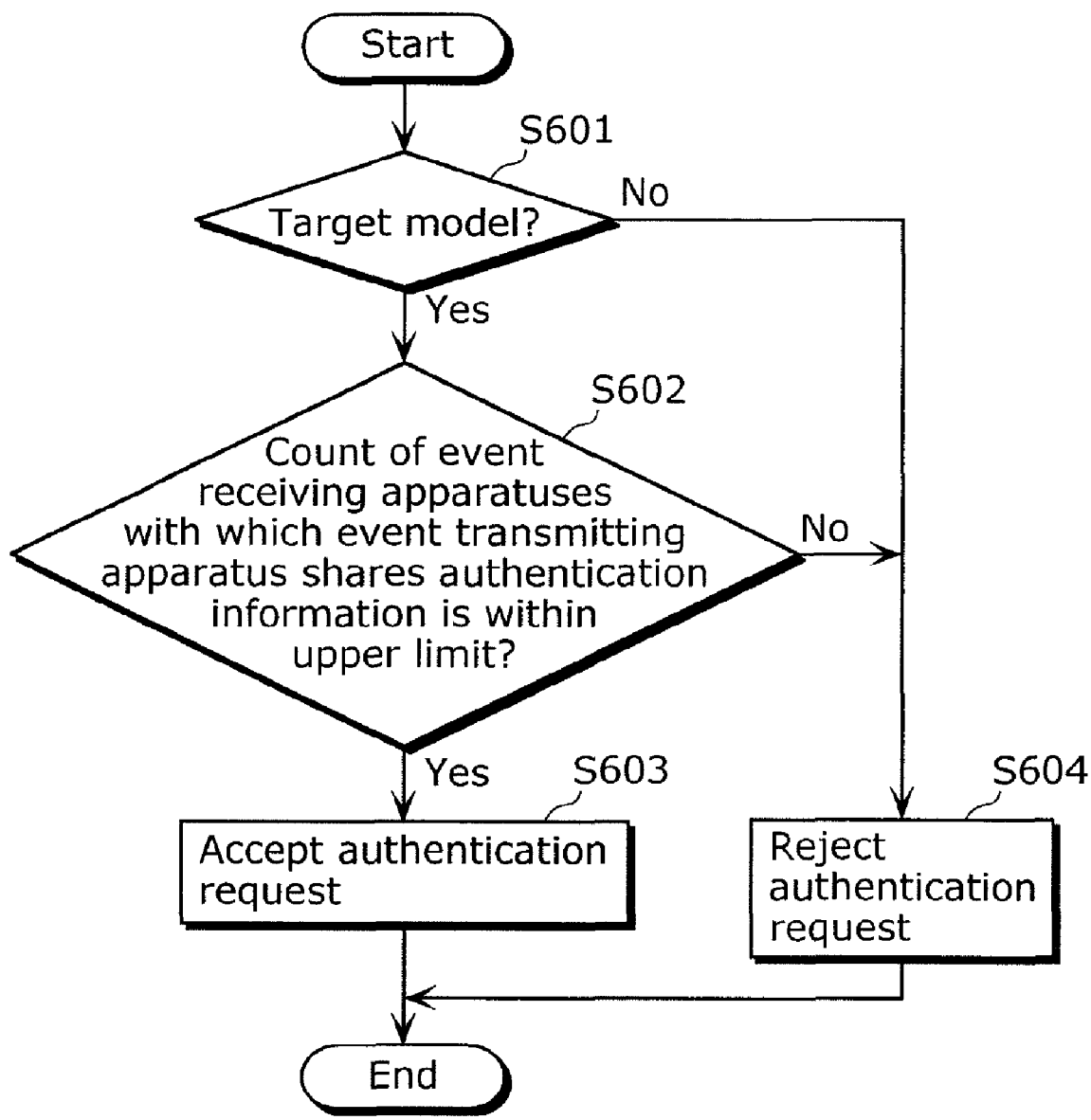
FIG. 26 illustrates a flowchart showing a procedure of authentication acceptance determination processing by the intercom according to Embodiment 2 in the present invention.

Hereinafter, details of determining whether or not authentication is accepted by the authentication verification unit 427 will be described. FIG. 26 illustrates a flowchart showing a procedure of authentication acceptance determination processing by the authentication verification unit 427.

First, the authentication verification unit 427 determines whether or not a model of an event receiving apparatus included in an authentication request message is a target model of an apparatus with which predetermined authentication information should be shared (S601).

The authentication verification unit 427 does not accept the authentication request (S604) when the model of the event receiving apparatus is not the predetermined model (No in S601).

In contrast, the authentication verification unit 427 determines whether or not a count of event receiving apparatuses with which the authentication verification unit 427 currently shares the authentication information is within an upper limit of a count of event receiving apparatuses with which the authentication verification unit 427 can share set authentication information (S603) when the model of the event receiving apparatuses is the predetermined model (Yes in S601). Here, the upper limit of a count of event receiving apparatuses with which the authentication verification unit 427 can share authentication information may be an upper limit that can be defined for each model and an upper limit of a count of all event receiving apparatuses unrelated to each model. Furthermore, the authentication verification unit 427 may determine whether or not a count of event receiving apparatuses with which the authentication verification unit 427 currently shares authentication information satisfies both conditions of being within an upper limit for each model and being with an upper limit of a count of all event receiving apparatuses.

The authentication verification unit 427 determines to accept the authentication request (S603) when the count of event receiving apparatuses with which the authentication verification unit 427 currently shares authentication information is within an upper limit of a count of event receiving apparatuses with which the authentication verification unit 427 can share set authentication information (Yes in S602), and determines not to accept the authentication request (S604) when the count of event receiving apparatuses exceeds the upper limit (No in S602).

The authentication verification unit 427 may determine only one of processes, namely, (i) whether or not a model of an event receiving apparatus is the predetermined model (S601) and (ii) whether or not a count of event receiving apparatuses with which the authentication verification unit 427 shares authentication information is within the upper limit that has been set (S602).

Here, when authentication information is shared, the authentication verification unit 427 obtains the authentication information (e.g., unique ID and a password) of the event receiving apparatus included in an authentication request message, and transfers the authentication information to the event-receiving-apparatus managing unit 428. The event-receiving-apparatus managing unit 428 manages the received authentication information.

Furthermore, when the authentication request message includes the information indicating one of an encryption method and a hash value calculating algorithm, the authentication verification unit 427 verifies whether or not the event transmitting apparatus supports one of the encryption method and the hash value calculating algorithm. The authentication verification unit 427 may accept the authentication request when the event transmitting apparatus supports one of them, and reject the authentication request when the event transmitting apparatus supports neither of them.

Furthermore, when the authentication request message includes the information indicating whether authentication information to be transmitted by an event receiving apparatus has already been shared with another event transmitting apparatus or indicating an initial value (i.e., the authentication information is not shared with another event transmitting apparatus), the authentication verification unit 427 verifies the authenticity of the authentication information according to the information, and determines the authentication information to be shared.

FIG. 27 shows a method in which the authentication verification unit 427 determines authentication information to be shared.

As illustrated in FIG. 27, when authentication information included in an authentication request message (authentication information held by an event receiving apparatus) and authentication information held by an event transmitting apparatus have respective initial values, the authentication verification unit 427 determines that the authentication information included in the authentication request message is authentication information to be shared. Furthermore, when one of the authentication information held by the event receiving apparatus and the authentication information held by the event transmitting apparatus has already been shared, the authentication verification unit 427 determines that the authentication information that has already been shared is authentication information to be shared. Furthermore, when the authentication information held by the event receiving apparatus and the authentication information held by the event transmitting apparatus have already been shared, the authentication verification unit 427 further determines whether or not the authentication information held by the event receiving apparatus and the authentication information held by the event transmitting apparatus are identical to each other. When the authentication information held by the event receiving apparatus and the authentication information held by the event transmitting apparatus are identical to each other, the authentication verification unit 427 determines that the authentication information is authentication information to be shared, and when they are not identical to each other, the authentication information is not shared therebetween (the authentication request is not accepted).

Next, the authentication verification unit 427 transmits an authentication response message indicating acceptance or rejection of an authentication request to the television 101 (S506). Furthermore, the authentication verification unit 427 transmits an authentication response message including authentication information to be shared to the television 101, when accepting the authentication request.

The event-transmitting-apparatus managing unit 412 of the television 101 that has received the authentication response message indicating the acceptance of the authentication request adds the authentication information included in the authentication response message to the management table. Next, the subscription request unit 415 transmits a subscription request message to the intercom 103 (S507). More specifically, the subscription request unit 415 transmits the subscription request message to an subscription-request access destination included in an apparatus information obtainment response message.

Figure 28:
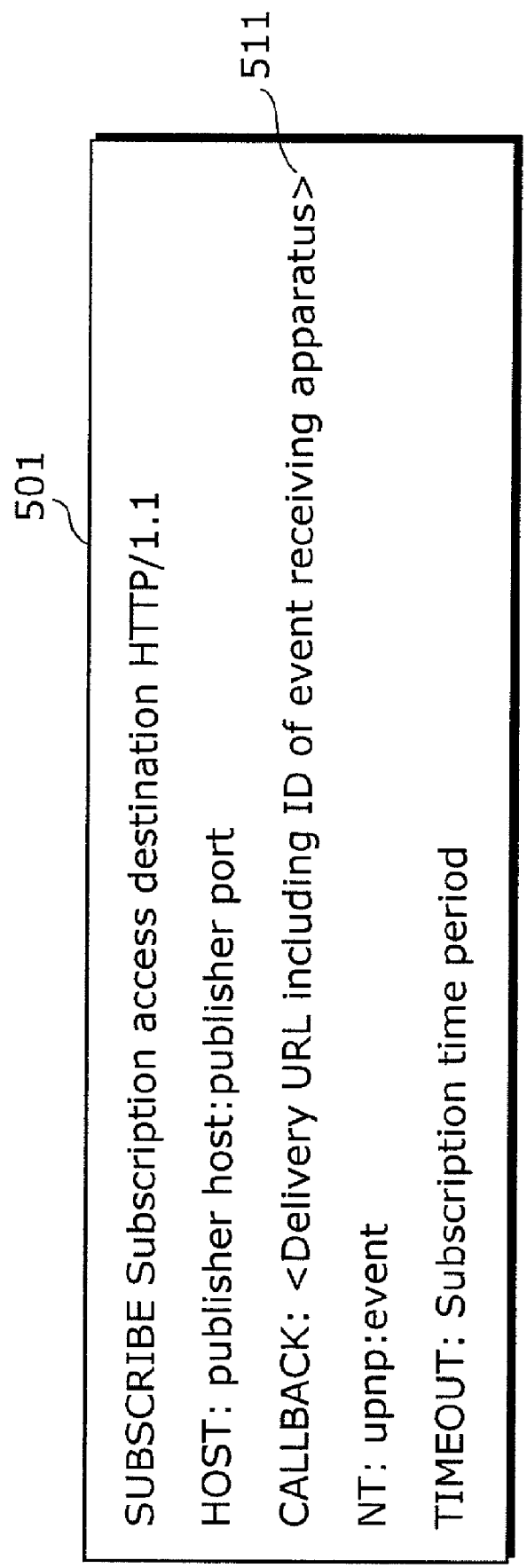
FIG. 28 illustrates an example of a subscription request message according to Embodiment 2 in the present invention.

The subscription request message includes event transmission destination information indicating a transmission destination of an event message when a state of the event transmitting apparatus is changed (an event occurs). FIG. 28 illustrates an example of a subscription request message 501. A CALLBACK 511 in the subscription request message 501 is the event transmission destination information. The CALLBACK 511 is a URL indicating a transmission destination of an event message, and the URL includes a unique ID (authentication information) of an event receiving apparatus.

The subscription verification unit 429 of the intercom 103 that has received the subscription request message verifies the unique ID of the television 101 that is included in the CALLBACK 511 to verify that the television 101 is an event receiving apparatus that has accepted the authentication when receiving an authentication request message. Furthermore, when the subscription request message is from the event receiving apparatus that has not accepted the authentication, in other words, when the CALLBACK 511 does not include the authentication information (unique ID) managed by the event-receiving-apparatus managing unit 428, the subscription verification unit 429 does not accept the subscription request message.

When the subscription verification unit 429 verifies that the subscription request message is from the event receiving apparatus that has accepted the authentication, the subscription verification unit 429 further determines whether or not to be able to manage the event receiving apparatus. More specifically, the subscription verification unit 429 determines whether or not to be able to manage the event receiving apparatus, according to whether or not a count of event receiving apparatuses that have accepted a subscription currently managed is within a predetermined upper limit. When the subscription verification unit 429 can manage the event receiving apparatus, it accepts the subscription request message.

Next, the subscription verification unit 429 transmits a subscription response message including information indicating whether or not a subscription requested in the subscription request message is accepted to the television 101 (S508).

As such, an event transmitting apparatus accepts the subscription only from the authenticated event receiving apparatus in the communication system 100 according to Embodiment 2 in the present invention. Thus, the event transmitting apparatus can transmit an event message only to a reliable event receiving apparatus.

Next, operations of an event receiving apparatus for performing subscription processing on an event transmitting apparatus, using a network connection notification message transmitted from the event transmitting apparatus as a trigger will be described.

Figure 29:
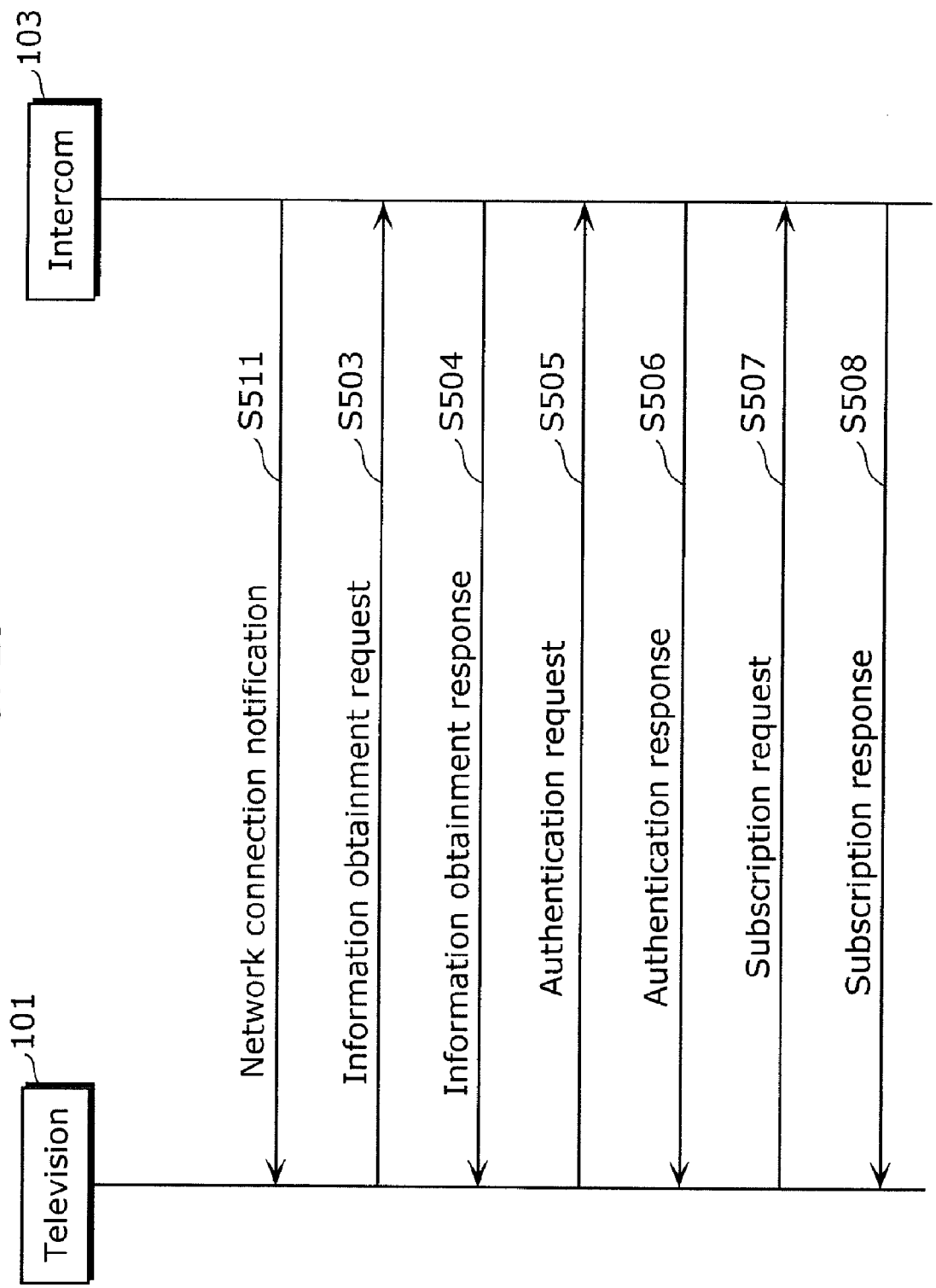
FIG. 29 shows a procedure of subscription processing by the communication system according to Embodiment 2 in the present invention.

FIG. 29 shows a processing procedure from transmission of a network connection notification message by an event transmitting apparatus to performing the subscription processing.

First, the network managing unit 422 of the intercom 103 transmits a network connection notification message to the television 101 through broadcasting or multicasting (S511). Here, the network connection notification message is a message for notifying the fact that an apparatus that has transmitted the network connection notification message is connected to a network. Furthermore, the network connection notification message includes an apparatus-information access destination that is a transmission destination of an information obtainment request message.

The event-transmitting-apparatus managing unit 412 of the television 101 that has received the network connection notification message adds a unique ID of the intercom 103 that is included in the network connection notification message and the apparatus-information access destination to the management table. Furthermore, the information obtainment request unit 416 transmits an information obtainment request message to the intercom 103 that is an event transmitting apparatus that is a transmission source of the network connection notification message. More specifically, the information obtainment request unit 416 transmits the information obtainment request message to the apparatus-information access destination included in the network connection notification message using a unicast connection (S503).

Here, when receiving the network connection notification message, the information obtainment request unit 416 performs filtering. In other words, the information obtainment request unit 416 determines whether or not the event transmitting apparatus that has transmitted the network connection notification message is an event transmitting apparatus predetermined to be managed. The information obtainment request unit 416 does not transmit an apparatus-information obtainment request message to an event transmitting apparatus when receiving a network connection notification message transmitted by an event transmitting apparatus to be excluded from the management.

The processes after Step S504 are the same as those in FIG. 25, and the descriptions are omitted.

As described above, an event transmitting apparatus shares authentication information with an event receiving apparatus before a subscription in the communication system 100 according to Embodiment 2 in the present invention. Furthermore, the event receiving apparatus transmits a subscription request message including the shared authentication information to the event transmitting apparatus.

Thereby, the event transmitting apparatus verifies the authentication information included in the subscription request message so that it can determine whether or not the event receiving apparatus that is a transmission source of the subscription request message is an authentic event receiving apparatus. Thus, the event transmitting apparatus can accept a subscription request only from an authentic event receiving apparatus desired to interact with each other.

Embodiment 3

A communication system 100 according to Embodiment 3 in the present invention is a variation of the communication system according to Embodiment 2. The communication system 100 according to Embodiment 3 has a registration mode for authenticating an event receiving apparatus.

The configuration of the communication system 100 according to Embodiment 3 is the same as that of the communication system 100 according to Embodiment 2, and the description is omitted.

Figure 30:
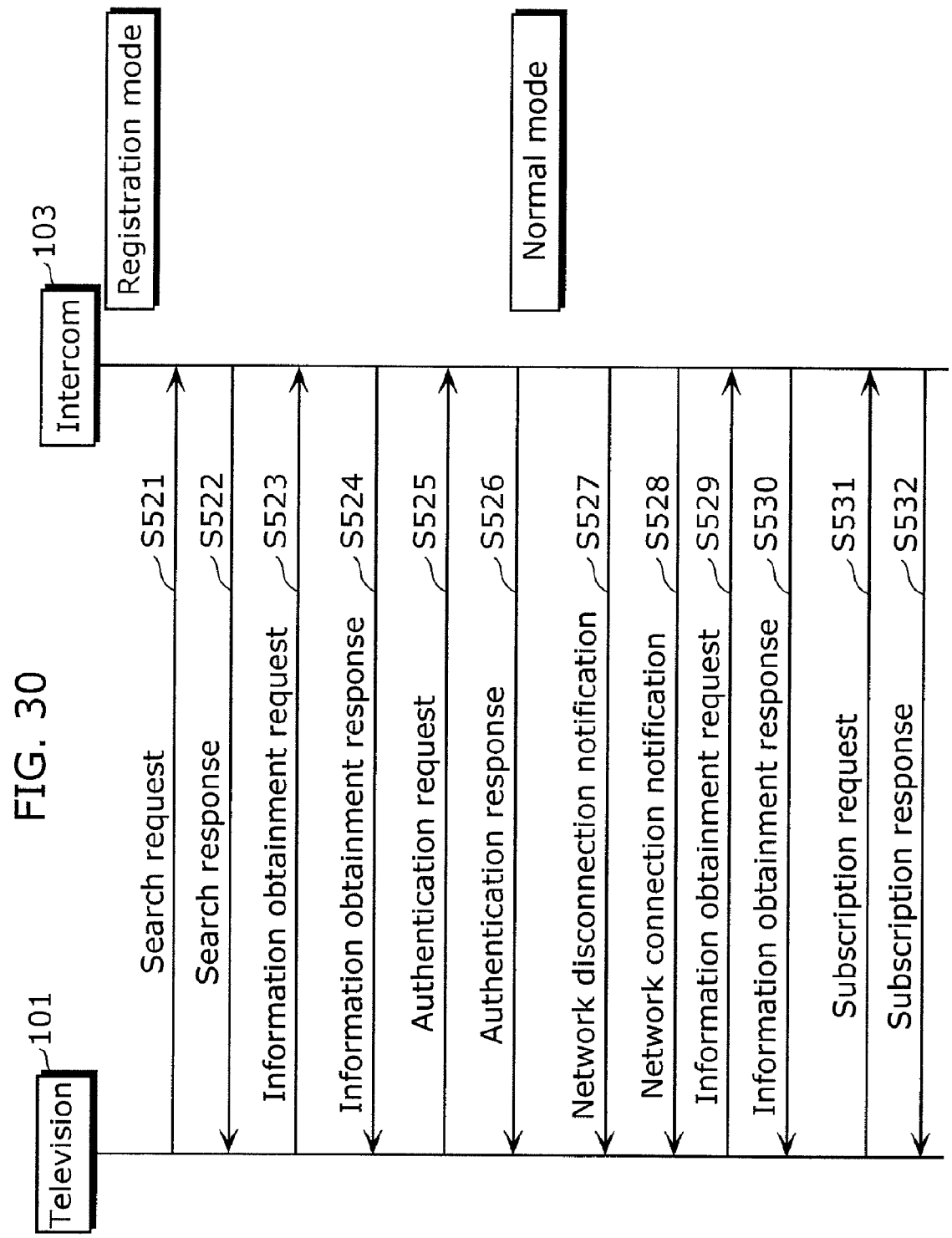
FIG. 30 illustrates a procedure of subscription processing by a communication system according to Embodiment 3 in the present invention.

FIG. 30 is a flowchart illustrating operations of the communication system 100 according to Embodiment 3 in the present invention.

An event transmitting apparatus included in the communication system 100 according to Embodiment 3 has a normal mode and a registration mode that can be switched in response to an operation from outside the communication system 100.

The registration mode is a special mode for sharing authentication information between an event receiving apparatus and an event transmitting apparatus. The normal mode is a mode in which a normal operation, such as a subscription request and a notification of an event, is performed.

For example, the normal mode is switched to the registration mode with a press of a button included in an event transmitting apparatus by the user. The switching between the normal mode and the registration mode may be performed (i) using a switch included in the event transmitting apparatus, (ii) through another user interface, or (iii) through the network 120 using an event receiving apparatus that has already shared authentication information with another event transmitting apparatus. Furthermore, the normal mode may be switched to the registration mode by turning on and off the event transmitting apparatus. In other words, the registration mode may be activated in a state where the event transmitting apparatus is turned on.

The processes in Steps S521 to S526 in FIG. 30 are the same as those in Steps S501 to S506 in FIG. 25, and thus the detailed descriptions are omitted.

After the intercom 103 transits to the registration mode, the search unit 413 of the television 101 transmits a search request message to the intercom 105 through broadcasting or multicasting (S521).

The search response unit 425 of the intercom 103 that has received the search request message transmits a search response message to the television 101 when the intercom 103 satisfies a search condition included in the search request message (S522).

The information obtainment request unit 416 of the television 101 that has received the search response message transmits an information obtainment request message to an apparatus-information access destination included in the search response message (S523).

The information providing unit 426 of the intercom 103 that has received the information obtainment request message transmits an information obtainment response message to the television 101 (S524).

The authentication request unit 414 of the television 101 that has received the information obtainment response message transmits an authentication request message to an authentication-request access destination included in the information obtainment response message (S525).

The authentication verification unit 427 of the intercom 103 that has received the authentication request message determines whether or not to be able to accept the authentication request, and transmits an authentication response message indicating acceptance or rejection of the authentication request to the television 101 (S526).

Next, after the intercom 103 transits from the registration mode to the normal mode, it is temporarily disconnected from the network 120.

The network managing unit 422 of the intercom 103 transmits a network disconnection notification message to the television 101 through broadcasting or multicasting in order to notify the event receiving apparatus of the fact that the intercom 103 is disconnected from the network 120 (S527).

Then, the intercom 103 is reconnected to the network 120, and transmits, to the television 101, a network connection notification message for notifying the event receiving apparatus of the reconnection to the network 120 (S528). The network connection notification message includes an apparatus-information access destination.

The information obtainment request unit 416 of the television 101 that has received the network connection notification message transmits an information obtainment request message to the intercom 103 that is an event transmitting apparatus that is a transmission source of the network connection notification message (S529). More specifically, the information obtainment request unit 416 transmits the information obtainment request message to the apparatus-information access destination included in the network connection notification message using a unicast connection.

The processes in Steps S528 to S532 are the same as those in Steps S503, S504, S507, and S508 in FIG. 29, and thus the detailed descriptions are omitted.

The information providing unit 426 of the intercom 103 that has received the information obtainment request message transmits an information obtainment response message to the television 101 (S530).

The television 101 that has received the information obtainment response message transmits a subscription request message to a subscription-request access destination included in the information obtainment response message (S531).

The subscription verification unit 429 of the intercom 103 that has received the subscription request message verifies the unique ID of the television 101 that is included in the subscription request message to verify that the television 101 is an event receiving apparatus that has accepted the authentication.

Next, the subscription verification unit 429 transmits a subscription response message including information indicating whether or not a subscription requested in the subscription request message is accepted to the television 101 (S532).

As such, since an event transmitting apparatus shares authentication information only in the registration mode that is a special mode, the communication system 100 according to Embodiment 3 in the present invention can more significantly prevent a false connection and an unauthorized access, compared to the communication system according to Embodiment 2.

Although a process of sharing authentication information starts when an event receiving apparatus transmits a search request message to an event transmitting apparatus after the event transmitting apparatus transits to the registration mode in the description, the process may start when the event transmitting apparatus transmits a network connection notification message.

Figure 31:
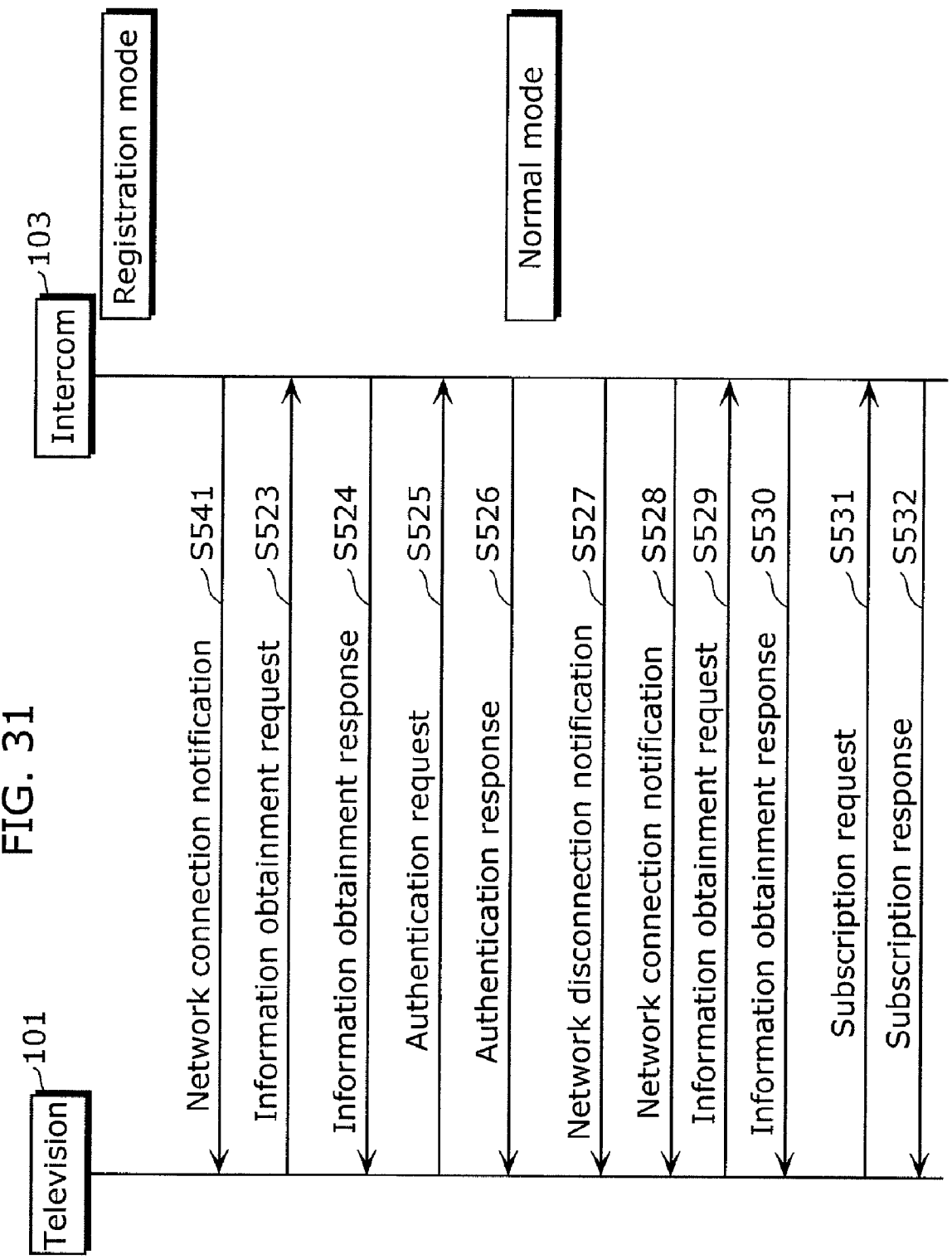
FIG. 31 illustrates a procedure of subscription processing by the communication system according to Embodiment 3 in the present invention.

FIG. 31 shows a processing procedure from transmission of a network connection notification message by an event transmitting apparatus that has transited to the registration mode to performing the subscription processing by an event receiving apparatus on the event transmitting apparatus.

First, the network managing unit 422 of the intercom 103 that has transited to the registration mode transmits a network connection notification message to the television 101 through broadcasting or multicasting (S541).

The information obtainment request unit 416 of the television 101 that has received the network connection notification message transmits an information obtainment request message to the intercom 103 that is an event transmitting apparatus that is a transmission source of the network connection notification message. More specifically, the information obtainment request unit 416 transmits the information obtainment request message to the apparatus-information access destination included in the network connection notification message (S523).

The processes after Step S523 are the same as those in FIG. 30, and the descriptions are omitted.

Furthermore, although authentication information is shared only when an event transmitting apparatus is in the registration mode in the description, the authentication information may be shared when an event receiving apparatus has the registration mode and the normal mode, and the event transmitting apparatus and the event receiving apparatus are in the registration mode.

Embodiment 4

Embodiment 4 in the present invention will describe operations when apparatus information of an event transmitting apparatus are changed.

The configuration of the communication system 100 according to Embodiment 4 in the present invention is the same as that of the communication system 100 according to Embodiment 2, and the description is omitted.

Figure 32:
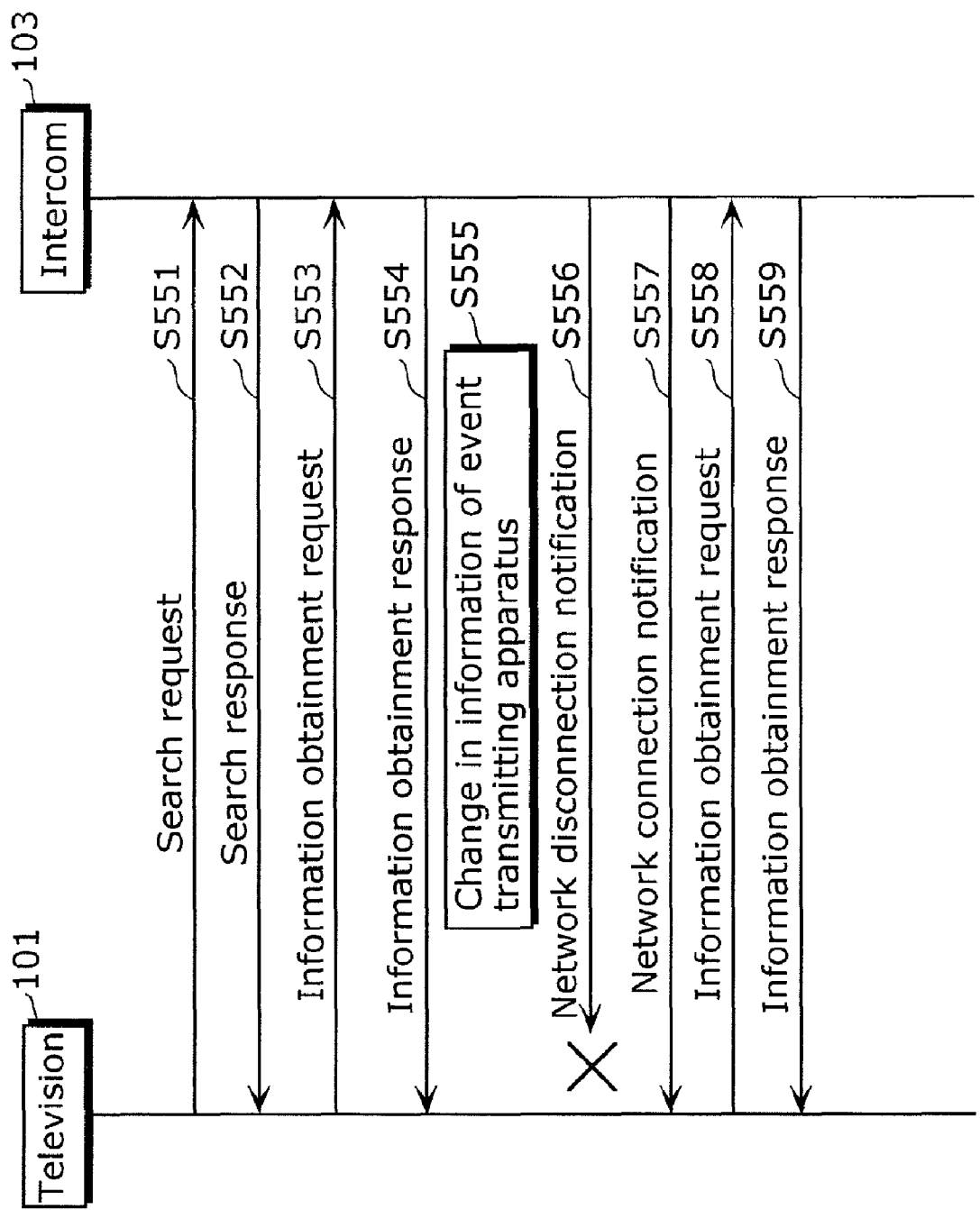
FIG. 32 illustrates a procedure of subscription processing by a communication system according to Embodiment 4 in the present invention.

FIG. 32 illustrates a processing procedure when apparatus information of an event transmitting apparatus is changed in the communication system 100 according to Embodiment 4 in the present invention.

The processes in Steps S551 to S554 in FIG. 32 are the same as those in Steps S501 to S504 in FIG. 25, and thus the detailed descriptions are omitted.

First, the search unit 413 of the television 101 transmits a search request message to the intercom 103 through broadcasting or multicasting (S551).

The search response unit 425 of the intercom 103 that has received the search request message transmits a search response message to the television 101 when the intercom 103 satisfies the search condition included in the search request message (S552).

The information obtainment request unit 416 of the television 101 that has received the search response message transmits an information obtainment request message to an apparatus-information access destination included in the search response message (S553).

The information providing unit 426 of the intercom 103 that has received the information obtainment request message transmits an information obtainment response message to the television 101 (S554).

Then, the apparatus information of the intercom 103 is changed (S555). Here, the apparatus information of the intercom 103 includes a name and an IP address of the intercom 103, and a service supported by the intercom 103. The service supported by the intercom 103 is changed according to change in an operation status (a registration mode and a normal mode).

When the apparatus information of the intercom 103 is changed, the network managing unit 422 of the intercom 103 transmits a network disconnection notification message to the television 101 (S556), and immediately afterward, it transmits a network connection notification message to the television 101 (S557).

Here, when the television 101 fails to receive the network disconnection notification message, it receives the network connection notification message immediately afterward. Here, the television 101 checks an unique ID of an event transmitting apparatus that is included in the network connection notification message to determine whether or not an event transmitting apparatus that is a transmission source of the network connection notification message is an event transmitting apparatus that has already been managed.

According to the conventional technique, when the event transmitting apparatus that is the transmission source of the network connection notification message has already been managed, the television 101 does not transmit an information obtainment request message to the intercom 103. Thereby, the television 101 cannot detect change in the apparatus information of the intercom 103, and thus the apparatus information of the intercom 103 cannot be updated.

In response, the intercom 103 in the communication system 100 according to Embodiment 4 in the present invention changes an apparatus-information access destination to be transmitted after changing the apparatus information and that is included in a network connection notification message from an apparatus-information access destination in the apparatus information before changed.

FIG. 33 illustrates an example of a network connection notification message 521. A LOCATION 531 in FIG. 33 indicates an apparatus-information access destination of an event transmitting apparatus, and a USN 532 indicates a unique ID of the event transmitting apparatus. In other words, the intercom 103 changes the LOCATION 531 included in the network connection notification message to be transmitted after changing apparatus information, from the LOCATION 531 before changing the apparatus information, and transmits a network connection notification message including the changed LOCATION 531 to the television 101 (S557).

The information obtainment request unit 416 that has received the network connection notification message determines whether or not the event-transmitting-apparatus managing unit 412 has already managed the unique ID (USN 532) of the intercom 103 that is included in the network connection notification message. When the event-transmitting-apparatus managing unit 412 has already managed the unique ID of the intercom 103, the information obtainment request unit 416 determines whether or not the apparatus-information access destination of the intercom 103 that has been managed is identical to an apparatus-information access destination included in the network connection notification message. When the apparatus-information access destination that has been managed is identical to the apparatus-information access destination included in the network connection notification message, the information obtainment request unit 416 does not transmit an information obtainment request message. When they are different from each other, the information obtainment request unit 416 transmits an information obtainment request message to the intercom 103 (S558).

When the event-transmitting-apparatus managing unit 412 has not yet managed the unique ID of the intercom 103, in other words, e.g., correctly receives an network disconnection notification message, the information obtainment request unit 416 transmits an information obtainment request message to the intercom 103 (S558).

The information providing unit 426 of the intercom 103 that has received the information obtainment request message transmits an information obtainment response message to the television 101 that is a transmission source of the information obtainment request message (S559).

Thereby, the television 101 can obtain apparatus information of the intercom 103 that has been changed in Step S555. Furthermore, even when the television 101 fails to correctly receive a network disconnection notification message, it can obtain apparatus information of the intercom 103 that has been changed.

Figure 34:
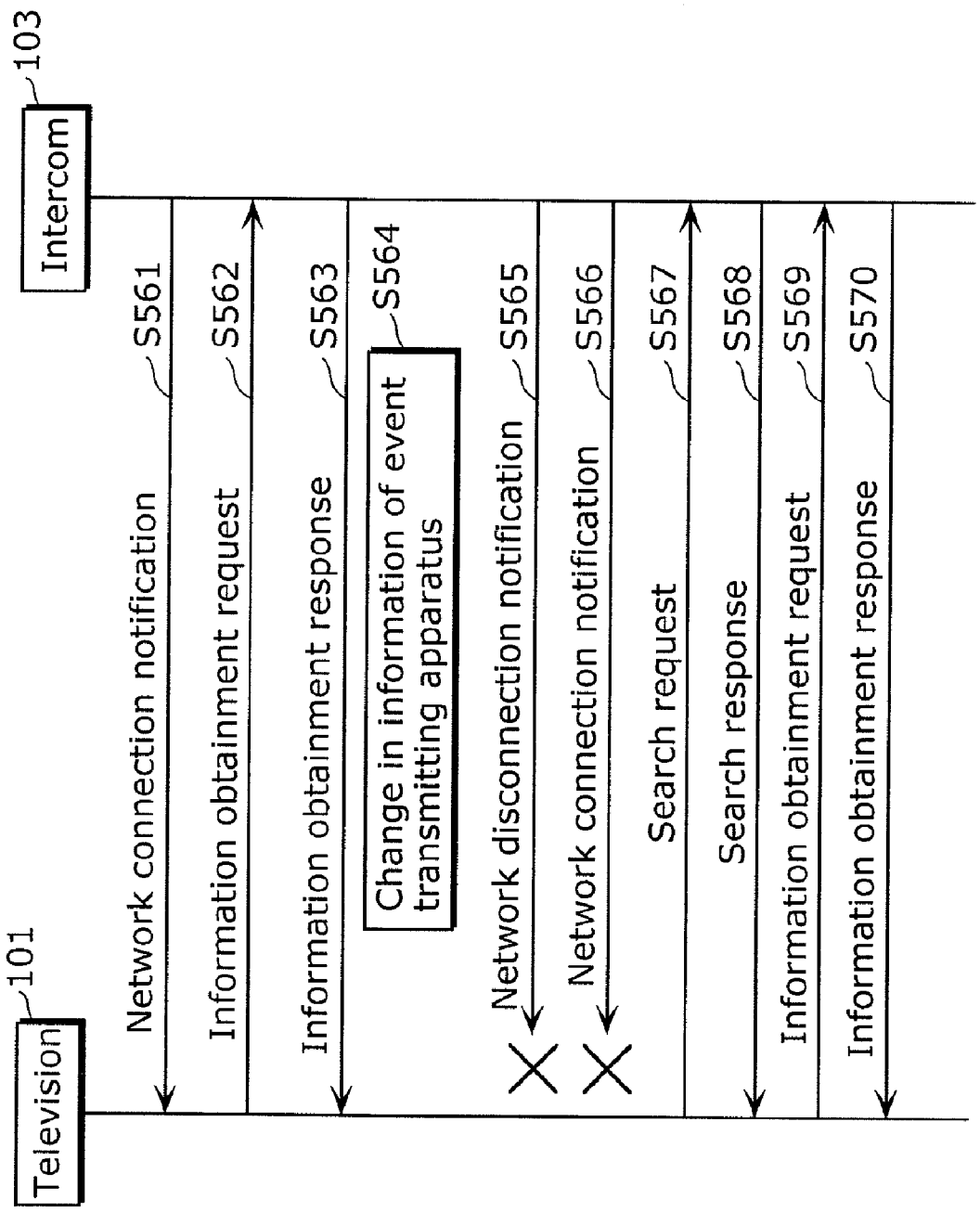
FIG. 34 illustrates a procedure of subscription processing by the communication system according to Embodiment 4 in the present invention.

FIG. 34 illustrates another example of a processing procedure when information of an event transmitting apparatus is changed in the communication system 100 according to Embodiment 4 in the present invention.

First, the network managing unit 422 of the intercom 103 transmits a network connection notification message to the television 101 through broadcasting or multicasting (S561).

The information obtainment request unit 416 of the television 101 that has received the network connection notification message transmits an information obtainment request message to the intercom 103 that is an event transmitting apparatus that is a transmission source of the network connection notification message (S562).

The processes in Steps S562 to S566 are the same as those in Steps S553 to S557 in FIG. 32, and thus the detailed descriptions are omitted.

Assume a case where the television 101 fails to receive a network disconnection notification message and a network connection notification message. In this case, although the television 101 can detect neither a disconnection nor a connection of the intercom 103 from the network 120, the television 101 transmits a search request message to the intercom 103 after a predetermined period of time, because the television 101 transmits the search request message at fixed time intervals (S567).

The intercom 103 that has received the search request message transmits a search response message to the television 101 when the intercom 103 satisfies a search condition included in the search request message.

The information obtainment request unit 416 of the television 101 that has received the search response message verifies the unique ID of the intercom 103 that is included in the search response message.

According to the conventional technique, when the event-transmitting-apparatus managing unit 412 of the television 101 has already managed a unique ID of an event transmitting apparatus, the information obtainment request unit 416 does not transmit an information obtainment request message to the intercom 103. Thereby, the television 101 cannot detect change in the apparatus information of the intercom 103, and thus the apparatus information of the intercom 103 cannot be updated.

In response, the intercom 103 in the communication system 100 according to Embodiment 4 in the present invention changes an apparatus-information access destination included in a search response message to be transmitted after changing the apparatus information, from an apparatus-information access destination in the apparatus information before changed.

FIG. 35 illustrates an example of a search response message 541. A LOCATION 551 in FIG. 35 indicates an apparatus-information access destination, and a USN 552 indicates a unique ID of an event transmitting apparatus. In other words, the intercom 103 changes the LOCATION 551 included in the network connection notification message to be transmitted after changing apparatus information, from the LOCATION 551 before changing the apparatus information, and transmits a search response message including the changed LOCATION 551 to the television 101 (S568).

The information obtainment request unit 416 that has received the search response message determines whether or not the event-transmitting-apparatus managing unit 412 has already managed the unique ID (USN 532) of the intercom 103 that is included in the search response message. When the event-transmitting-apparatus managing unit 412 has already managed the unique ID of the intercom 103, the information obtainment request unit 416 determines whether or not the apparatus-information access destination of the intercom 103 that has been managed is identical to an apparatus-information access destination included in the search response message. When the apparatus-information access destination that has been managed is identical to the apparatus-information access destination included in the search response message, the information obtainment request unit 416 does not transmit an information obtainment request message. When they are different from each other, the information obtainment request unit 416 transmits an information obtainment request message to the intercom 103 (S569).

The information providing unit 426 of the intercom 103 that has received the information obtainment request message transmits an information obtainment response message to the television 101 that is a transmission source of the information obtainment request message (S570).

Thereby, the television 101 can obtain apparatus information of the intercom 103 that has been changed in Step S564. Furthermore, even when the television 101 fails to correctly receive an network disconnection notification message and a network connection notification message, it can obtain apparatus information of the intercom 103 that has been changed.

Although the communication system 100 according to Embodiments in the present invention is described hereinbefore, the present invention is not limited to such Embodiments.

For example, although the communication system 100 is a communication system using the UPnP in the description, it may be a communication system using another communication protocol.

INDUSTRIAL APPLICABILITY

The present invention is applicable to a communication system and a communication apparatus, and particularly to a communication apparatus that notifies another communication apparatus of occurrence of an event and to an communication apparatus that receives the notification.

The invention claimed is:

1. A communication apparatus that notifies an event receiving apparatus of an occurrence of an event, the event receiving apparatus being connected to said communication apparatus via a network, said communication apparatus comprising:
an event message generating unit configured to generate an event message indicating the occurrence of the event, the event message including a plurality of media information, each of the plurality of media information indicating a media type of the media on which event information is transmitted, wherein (i) the media information obtainable by the event receiving apparatus, (ii) the event information is associated with the event, and (iii) the media type indicated by each of the plurality of media information identifies a different format of the media on which the event information is transmitted; and
a communication unit configured to transmit the event message to the event receiving apparatus via the network,
wherein the media type indicates one of a video format, a still image format, and an audio format, and
wherein each of the plurality of media information indicates, in addition to the media type of the media on which the event information is transmitted, a compression method of the media on which the event information is transmitted, a transmission method of the media on which the event information is transmitted, and a pixel size when the media type indicated by the media information is one of the video format and the still image format.

2. The communication apparatus according to claim 1, further comprising an information transmitting unit configured to transmit the media, which is the event information, to the event receiving apparatus in a medium designated by the event receiving apparatus, from among the media indicated by the plurality of media information.

3. The communication apparatus according to claim 2, wherein each of the plurality of media information further includes information indicating a storage location of the media, and
wherein said information transmitting unit is configured to specify the event information using the information indicating the storage location designated by the event receiving apparatus, and to transmit the specified event information to the event receiving apparatus.

4. The communication apparatus according to claim 1, wherein the event message further includes category information indicating one of an event category of the event, an event type of the event, and a combination of the event category and the event type of the event.

5. The communication apparatus according to claim 1, further comprising a setting holding unit configured to hold setting information in which each setting of event categories, event types, or combinations of the event categories and the event types of the event indicates whether or not it is necessary to notify the event receiving apparatus of the event,
wherein said event message generating unit is configured to generate the event message of the event including one of the event categories, one of the event types, or one of the combinations of the event categories and the event types that is set in the setting information as being necessary to notify the event receiving apparatus, and to not generate the event message of the event including one of the event categories, one of the event types, or one of the combinations of the event categories and the event types that is set in the setting information as not being necessary to notify the event receiving apparatus.

6. The communication apparatus according to claim 1, further comprising:
an authentication unit configured to share authentication information between said communication apparatus and the event receiving apparatus, when said communication apparatus receives an authentication message including the authentication information from the event receiving apparatus; and
a subscription verification unit configured to accept, when a subscription request message transmitted by the event receiving apparatus includes the shared authentication information, a subscription for transmitting the event message to the event receiving apparatus when the event occurs, and to not to accept the subscription when the subscription request message does not include the shared authentication information.

7. The communication apparatus according to claim 6, wherein the authentication information includes an identification unique to said communication apparatus.

8. The communication apparatus according to claim 6, wherein the authentication information includes a password unrelated to information unique to said communication apparatus and the event receiving apparatus.

9. The communication apparatus according to claim 6,
wherein the authentication message includes model information indicating a model of the event receiving apparatus, and
wherein said authentication unit is configured to share the authentication information with the event receiving apparatus when the model information indicates a predetermined model, and to not share the authentication information with the event receiving apparatus when the model information does not indicate the predetermined model.

10. The communication apparatus according to claim 6,
wherein said authentication unit is configured to share the authentication information with event receiving apparatuses including the event receiving apparatus, and
wherein said authentication unit is configured to share the authentication information with one of the event receiving apparatuses that is a transmission source of the authentication message when a count of the event receiving apparatuses with which said authentication unit has shared the authentication information is smaller than a predetermined count, and to not share the authentication information with the one of the event receiving apparatuses that is the transmission source of the authentication message when the count of the event receiving apparatuses with which said authentication unit has shared the authentication information is not smaller than the predetermined count.

11. The communication apparatus according to claim 10,
wherein the authentication message includes model information indicating a model of the event receiving apparatus,
wherein the predetermined count is set for each model of the event receiving apparatuses, and
wherein said authentication unit is configured to share the authentication information with the one of the event receiving apparatuses that is the transmission source of the authentication message when a count of event receiving apparatuses that are of a same model as the one of the event receiving apparatuses is smaller than a predetermined count set to the model, among the event receiving apparatuses with which said communication apparatus has shared the authentication information, and to not share the authentication information with the one of the event receiving apparatuses when the count of the event receiving apparatuses that are of the same model as the one of the event receiving apparatuses is not smaller than the predetermined count set to the model, among the event receiving apparatuses with which said communication apparatus has shared the authentication information.

12. The communication apparatus according to claim 6,
wherein said communication apparatus has a normal mode and a registration mode that can be switched in response to an operation from outside said communication apparatus,
wherein said authentication unit is configured to share the authentication information between said communication apparatus and the event receiving apparatus when said communication apparatus is in the registration mode, and
wherein said subscription verification unit is configured to accept the subscription when said communication apparatus is in the normal mode.

13. The communication apparatus according to claim 1, further comprising:
an information providing unit configured to transmit an information obtainment response message to the event receiving apparatus, when said communication apparatus receives an information obtainment request message from the event receiving apparatus, the information obtainment request message requesting obtainment of information of said communication apparatus, and the information obtainment response message including a storage location of the information of said communication apparatus; and
a network managing unit configured to transmit, to the event receiving apparatus, a connection notification message for notifying the event receiving apparatus of information indicating that said communication apparatus is connected to the network,
wherein the connection notification message includes the storage location of the information of said communication apparatus, and
wherein said information providing unit is configured to change the storage location of the information of said communication apparatus when the information of said communication apparatus is changed.

14. A communication apparatus that receives an event message from an event transmitting apparatus, the event message indicating an occurrence of an event, said communication apparatus being connected to the event transmitting apparatus via a network,
wherein the event message includes a plurality of media information, each of the plurality of media information indicating a media type of the media on which event information is transmitted, wherein (i) the media information is obtainable by said communication apparatus, (ii) the even information is associated with the event, and (iii) the media type indicated by each of the plurality of media information identifies a different format of the media on which the event information is transmitted,
wherein said communication apparatus comprises:
a communication unit configured to receive the event message transmitted from the event transmitting apparatus via the network;
a media selecting unit configured to select the media on which the even information is transmitted indicated by at least one of the plurality of media information;
an information obtaining unit configured to obtain the event information of the selected media; and
an event information processing unit configured to process the obtained event information,
wherein the media type indicates one of a video format, a still image format, and an audio format, and
wherein said media selecting unit is configured to select a corresponding media on which the even information is transmitted, as indicated by one of the plurality of media information, that is predetermined and can be processed by said communication apparatus.

15. The communication apparatus according to claim 14,
wherein each of the plurality of media information includes information indicating a storage location of the media, and
wherein said information obtaining unit is configured to obtain the event information using the information indicating a corresponding one of the storage locations that is associated with the selected media.

16. The communication apparatus according to claim 14,
wherein the event message further includes category information indicating one of an event category of the event, an event type of the event, and a combination of the event category and the event type of the event,
wherein said communication apparatus further comprises a setting holding unit configured to hold setting information in which each setting of event categories, event types, or combinations of the event categories and the event types of the event indicates whether or not it is necessary to obtain the event information associated with the event, and
wherein said information obtaining unit is configured to obtain the event information when the category information indicates one of the event categories, one of the event types, or one of the combinations of the event categories and the event types that is set in the setting information as being necessary to obtain the event information, and to not obtain the event information when the category information indicates one of the event categories, one of the event types, or one of the combinations of the event categories and the event types that is set in the setting information as not being necessary to obtain the event information.

17. The communication apparatus according to claim 14, further comprising:
an authentication request unit configured to transmit, to the event transmitting apparatus, an authentication message for sharing authentication information between said communication apparatus and the event transmitting apparatus; and
a subscription request unit configured to transmit a subscription request message to the event transmitting apparatus, the subscription request message requesting said communication apparatus to transmit the event message,
wherein the subscription request message includes the authentication information.

18. The communication apparatus according to claim 17, wherein the authentication information includes an identification unique to said communication apparatus.

19. The communication apparatus according to claim 17, wherein the authentication information includes a password unrelated to information unique to said communication apparatus and the event transmitting apparatus.

20. The communication apparatus according to claim 17, wherein said authentication request unit is configured to transmit, to the event transmitting apparatus, the authentication message including model information indicating a model of said communication apparatus.

21. The communication apparatus according to claim 20, wherein the model information includes one of a product number, a production date, and a serial number of said communication apparatus.

22. The communication apparatus according to claim 17, wherein said authentication request unit is configured to transmit shared information to the event transmitting apparatus, the shared information indicating whether said communication apparatus has already shared the authentication information with an apparatus other than the event transmitting apparatus.

23. An event processing method of a communication apparatus that notifies an event receiving apparatus of an occurrence of an event, the event receiving apparatus being connected to the communication apparatus via a network, said method comprising:
generating an event message, via an event message generating unit of the communication apparatus, indicating the occurrence of the event, the event message including a plurality of media information, each of the plurality of media information indicating a media type of the media on which event information is transmitted, wherein (i) the media information is obtainable by the event receiving apparatus, (ii) the event information is associated with the event, and (iii) the media type indicated by each of the plurality of media information identifies a different format of the media on which the event information is transmitted; and
transmitting the event message to the event receiving apparatus via the network,
wherein the media type indicates one of a video format, a still image format, and an audio format, and
wherein each of the plurality of media information indicates, in addition to the media type of the media on which event information is transmitted, a compression method of the media on which the event information is transmitted, a transmission method of the media on which the event information is transmitted, and a pixel size when the media type indicated by the media information is one of the video format and the still image format.

24. An event processing method of a communication apparatus that receives an event message from an event transmitting apparatus, the event message indicating an occurrence of an event, and the communication apparatus being connected to the event transmitting apparatus via a network,
wherein the event message includes a plurality of media information, each of the plurality of media information indicating a media type of the media on which event information is transmitted, wherein (i) the media information is obtainable by the communication apparatus, (ii) the event information is associated with the event, and (iii) the media type indicated by each of the plurality of media information identifies a different format of the media on which the event information is transmitted,
wherein said method comprises:
receiving, via a communication unit of the communication apparatus, the event message transmitted from the event transmitting apparatus via the network;
selecting the media indicated by at least one of the plurality of media information;
obtaining the event information of the selected media; and
processing the obtained event information,
wherein the media type indicates one of a video format, a still image format, and an audio format, and
wherein said selecting selects a corresponding media on which the event information is transmitted, as indicated by one of the plurality of media information, that is predetermined and can be processed by the communication apparatus.

25. The communication apparatus according to claim 1, wherein the transmission method is one of a method of using information for a browser and a method of using a Real-time Transport Protocol (RTP).

26. The communication apparatus according to claim 14, wherein the transmission method is one of a method of using information for a browser and a method of using a Real-time Transport Protocol (RTP).

* * * * *